US012570325B2

(12) United States Patent
Jin et al.

(10) Patent No.: US 12,570,325 B2
(45) Date of Patent: Mar. 10, 2026

(54) VEHICLE MOVING METHOD AND VEHICLE

(71) Applicant: Shenzhen Yinwang Intelligent Technologies Co., Ltd., Shenzhen (CN)

(72) Inventors: Biao Jin, Shanghai (CN); Weimiao Yang, Shanghai (CN); Yongsheng Zhang, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 208 days.

(21) Appl. No.: 18/045,157

(22) Filed: Oct. 9, 2022

(65) Prior Publication Data

US 2023/0053728 A1    Feb. 23, 2023

Related U.S. Application Data

(63) Continuation of application No. PCT/CN2020/084311, filed on Apr. 10, 2020.

(51) Int. Cl.
    B60W 60/00          (2020.01)
(52) U.S. Cl.
    CPC ..... B60W 60/0025 (2020.02); *B60W 2554/20* (2020.02); *B60W 2554/80* (2020.02); *B60W 2756/10* (2020.02)
(58) Field of Classification Search
    CPC ......... B60W 60/0025; B60W 2554/20; B60W 2554/80; B60W 2756/10; G01C 21/3407;
    (Continued)

(56) References Cited

U.S. PATENT DOCUMENTS 11,921,503 B2 *    3/2024    Eshima ................. G08G 1/143
2014/0309917 A1    10/2014    Beaurepaire et al.
(Continued)

FOREIGN PATENT DOCUMENTS

CN          104290751 A        1/2015
CN          105376306 A        3/2016
(Continued)

OTHER PUBLICATIONS

Ishaya Emmanuel, Fuzzy Logic-Based Control for Autonomous Vehicle: A Survey, I.J. Education and Management Engineering, pp. 41-49 (Year: 2017).*

*Primary Examiner* — Anne Marie Antonucci
*Assistant Examiner* — Luis G Del Valle
(74) *Attorney, Agent, or Firm* — Leydig, Voit & Mayer, Ltd.

(57)          ABSTRACT

In a method for moving a vehicle out of a parking area, the vehicle obtains map information of the parking area and determines a current parking space of the vehicle and an exit location of the parking area. The vehicle determines a plurality of target departure routes from the current parking space to the exit location, and identifies blocking vehicles on the target departure routes that blocks it from reaching the exit. The vehicle estimates the preferability of each of the target departure routes based on a number of blocking vehicles on the target departure route and a difficulty level of removing the blocking vehicles from the target departure route. The vehicle then selects from the target departure routes a preferred departure route, and transmits requests to remove the blocking vehicles off the preferred departure route.

21 Claims, 10 Drawing Sheets

(58) Field of Classification Search
CPC .. G01C 21/3685; G06Q 10/047; G06Q 50/40;
H04W 4/021; H04W 4/14; H04W 4/40
See application file for complete search history.

(56) References Cited

U.S. PATENT DOCUMENTS

| | | | |
|---|---|---|---|
| 2017/0292854 A1* | 10/2017 | Zhang | G05D 1/0088 |
| 2017/0308095 A1 | 10/2017 | Irion et al. | |
| 2019/0371176 A1* | 12/2019 | Montemurro | H04L 67/125 |
| 2020/0105136 A1* | 4/2020 | Inoshita | H04W 4/024 |
| 2020/0198620 A1* | 6/2020 | Nakata | B60W 60/0053 |
| 2020/0302791 A1* | 9/2020 | Yamane | G08G 1/146 |
| 2021/0110683 A1* | 4/2021 | Guan | G01C 21/3461 |
| 2021/0181743 A1* | 6/2021 | Eshima | G08G 1/202 |
| 2021/0300337 A1* | 9/2021 | Fujitani | G08G 1/143 |
| 2022/0044566 A1* | 2/2022 | Subramanya | G06F 3/167 |
| 2022/0187847 A1* | 6/2022 | Cella | G05B 19/41885 |
| 2023/0101183 A1* | 3/2023 | Cella | G01C 21/343 |
| | | | 701/31.4 |

FOREIGN PATENT DOCUMENTS

| | | | |
|---|---|---|---|
| CN | 205524063 U | 8/2016 |
| CN | 106937006 A | 7/2017 |
| CN | 106965757 A | 7/2017 |
| CN | 107343110 A | 11/2017 |
| CN | 107705606 A | 2/2018 |
| CN | 107734201 A | 2/2018 |
| CN | 108494840 A | 9/2018 |
| CN | 108860008 A | 11/2018 |
| CN | 109466433 A | 3/2019 |
| CN | 109618295 A | 4/2019 |
| CN | 110246355 A | 9/2019 |
| EP | 3506234 A1 | 7/2019 |

\* cited by examiner

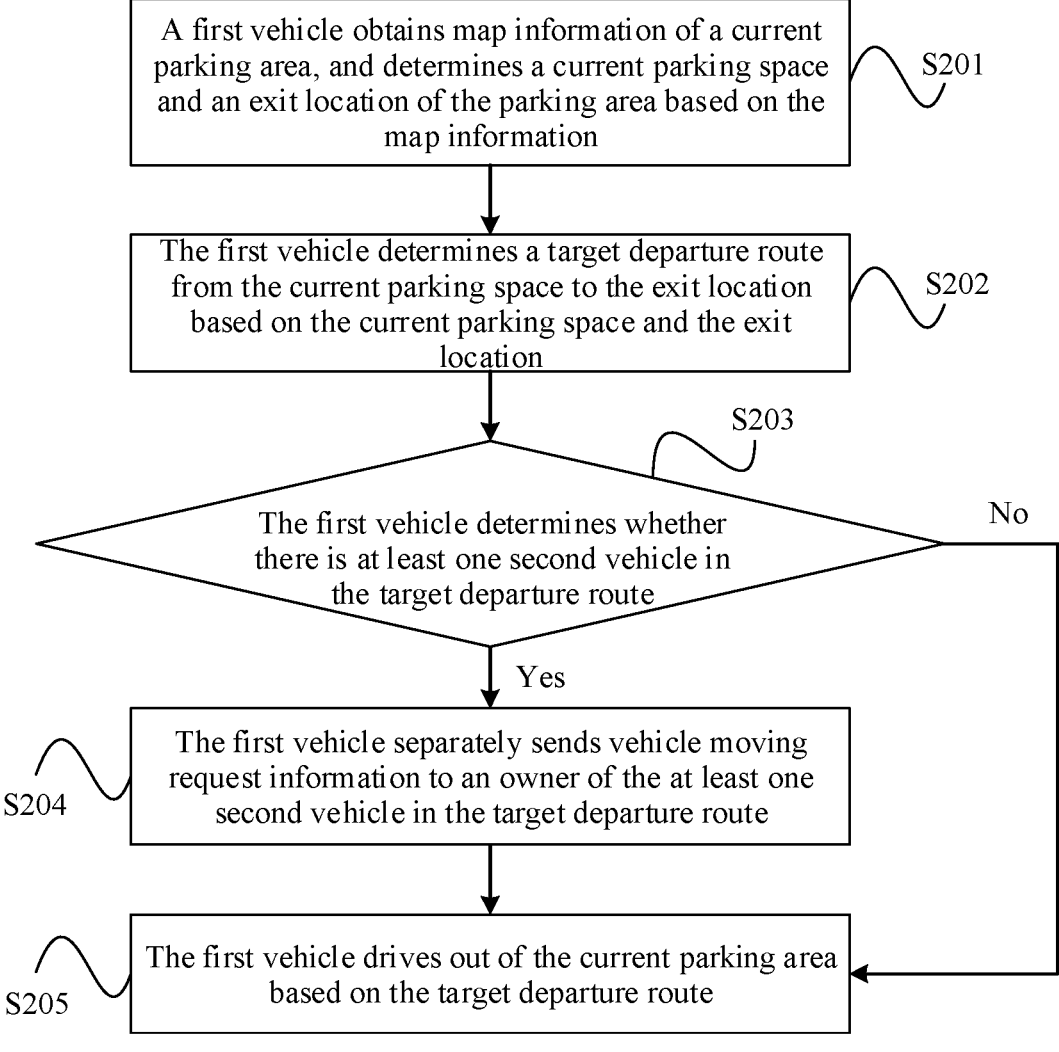

A first vehicle obtains map information of a current parking area, and determines a current parking space and an exit location of the parking area based on the map information

S201

The first vehicle determines a target departure route from the current parking space to the exit location based on the current parking space and the exit location

S202

S203

The first vehicle determines whether there is at least one second vehicle in the target departure route No Yes The first vehicle separately sends vehicle moving request information to an owner of the at least one second vehicle in the target departure route

S204

The first vehicle drives out of the current parking area based on the target departure route

VEHICLE MOVING METHOD AND VEHICLE

CROSS-REFERENCE TO RELATED APPLICATIONS

This application is a continuation of International Application PCT/CN2020/084311, filed on Apr. 10, 2020, the disclosure of which is hereby incorporated by reference in its entirety.

TECHNICAL FIELD

This application relates to the field of Internet of vehicles technologies, and in particular, to a method of moving a vehicle out of a parking area, and a vehicle equipped to do so.

BACKGROUND

Currently, as the number of cars increases, parking spaces of parking lots in most areas (such as enterprises, residential areas, and shopping malls) can hardly meet current parking demands of passenger vehicles, resulting in disorderly parking of vehicles. In this case, when a vehicle is blocked by another parked vehicle and cannot drive out of a parking space, the owner of the vehicle needs to go to the scene and to request, such as by telephone, the owner of the blocking vehicle to vacate the space. As a result, it takes a large amount of time for the vehicle to drive out of the parking space, and time and effort of the owner of the vehicle are seriously wasted.

SUMMARY

Embodiments of this application provide a vehicle moving method and a vehicle, to reduce time consumed by a to-be-driven-out vehicle to drive out of a parking space.

According to a first aspect, an embodiment of this application provides a vehicle moving method. In the method, a first vehicle obtains map information of a current parking area, and determines a current parking space and an exit location of the parking area based on the map information. Further, the first vehicle determines a target departure route from the current parking space to the exit location based on the current parking space and the exit location. Further, the first vehicle determines whether there is at least one second vehicle in the target departure route, and the second vehicle is a vehicle that obstructs the first vehicle from driving from the current parking space to the exit location. Further, when the first vehicle determines that there is the at least one second vehicle in the target departure route, the first vehicle separately sends vehicle moving request information to an owner of the at least one second vehicle, and the vehicle moving request information is used to request the at least one second vehicle to move.

The method described in this embodiment of this application may be performed by the first vehicle, or may be performed by a component (such as a processor chip, a circuit, or a vehicle-mounted controller) in the first vehicle. In the first aspect, that the method is performed by the first vehicle is used as an example for description. The first vehicle may be an intelligent vehicle, an autonomous vehicle, a connected vehicle, or the like. The first vehicle and another vehicle (including the second vehicle) located in the current parking area may form an Internet of vehicles system. In the Internet of vehicles system, any vehicle that is in the parking area and that is to drive out of the parking area may serve as the first vehicle.

In the foregoing design, the first vehicle may obtain the map information of the current parking area and automatically plan the target departure route from the current parking space to the exit location of the parking area. An owner of the first vehicle does not need to go to the parking area to plan a departure route corresponding to the first vehicle. Therefore, time of the owner of the first vehicle to plan the departure route of the first vehicle may be reduced. In addition, the first vehicle may further determine whether there is the at least one second vehicle in the target departure route. When determining that there is the at least one second vehicle in the target departure route, the first vehicle may separately send the vehicle moving request information to the owner of the at least one second vehicle, to request the at least one second vehicle to move. The owner of the first vehicle does not need to go to the parking area to request, by telephone, the owner of the second vehicle included in the planned departure route to vacate the space. Therefore, time consumed by the first vehicle to drive out of the current parking area may be reduced, so that time and effort of the owner of the first vehicle are reduced.

In a possible design, that the first vehicle determines that there is the at least one second vehicle in the target departure route includes: If the first vehicle detects the at least one second vehicle that is in the target departure route and that is around the current parking space, the first vehicle detects, by using the at least one second vehicle and an $i^{th}$ second vehicle, another second vehicle in the target departure route. The $i^{th}$ second vehicle is a vehicle in the another second vehicle. i is an integer greater than or equal to 1. When the first vehicle does not receive feedback information sent by the $i^{th}$ second vehicle, the first vehicle determines that there is the at least one second vehicle in the target departure route. The feedback information is used to feed back a parking space of an $(i+1)^{th}$ second vehicle. Alternatively, when the first vehicle receives feedback information sent by the $i^{th}$ second vehicle, the first vehicle determines that there are a plurality of second vehicles in the target departure route. When i is equal to 1, feedback information of a first second vehicle is sent by the first second vehicle after the first second vehicle receives detection information forwarded by the at least one second vehicle. Alternatively, when i is greater than 1, feedback information of an $(i+1)^{th}$ second vehicle is sent by the $(i+1)^{th}$ second vehicle after the $(i+1)^{th}$ second vehicle receives detection information forwarded by the $i^{th}$ second vehicle. The detection information is information that is sent by the first vehicle and that is used to indicate the $i^{th}$ second vehicle to detect a second vehicle in the target departure route.

In the foregoing design, the first vehicle may detect, by using another vehicle, the another second vehicle that is not in a detection range of the first vehicle and that is in the target departure route, which has a low requirement on recognition performance of the first vehicle, and has general applicability.

In a possible design, that the first vehicle determines a target departure route from the current parking space to the exit location based on the current parking space and the exit location includes: If the first vehicle detects that there is the at least one second vehicle around the current parking space, the first vehicle determines at least one departure route from the current parking space to the exit location based on the at least one second vehicle around the current parking space and the exit location. The first vehicle selects the target departure route from the at least one departure route.

In the foregoing design, the first vehicle may automatically determine the at least one departure route from the current parking space of the first vehicle to the exit location based on the exit location of the current parking area and the detected at least one second vehicle around the current parking space, so that the owner of the first vehicle does not need to go to the parking area to plan the departure route of the first vehicle. This can enrich the departure route along which the first vehicle drives out of the current parking area. In addition, this can avoid a disadvantage generated when the departure route of the first vehicle is determined only based on the map information of the current parking area, for example, when the first vehicle uses a navigation function based on the map information of the parking area but the navigation is inaccurate, the first vehicle cannot correctly plan the departure route or the planned departure route is relatively complex, which wastes a large amount of time and effort of the owner of the first vehicle.

In another possible design, that the first vehicle determines a target departure route from the current parking space to the exit location based on the current parking space and the exit location includes: If the first vehicle detects that there is the at least one second vehicle around the current parking space, the first vehicle detects, by using the at least one second vehicle and an $i^{th}$ vehicle, another second vehicle located between the at least one second vehicle and the exit location. The $i^{th}$ second vehicle is a vehicle in the another second vehicle. i is an integer greater than or equal to 1. The first vehicle receives feedback information sent by the $i^{th}$ second vehicle. The feedback information is used to feed back a parking space of an $(i+1)^{th}$ second vehicle. When i is equal to 1, feedback information of a first second vehicle is sent by the first second vehicle after the first second vehicle receives detection information forwarded by the at least one second vehicle. Alternatively, when i is greater than 1, feedback information of the $(i+1)^{th}$ second vehicle is sent by the $(i+1)^{th}$ second vehicle after the $(i+1)^{th}$ second vehicle receives detection information forwarded by the $i^{th}$ second vehicle. The detection information is information that is sent by the first vehicle and that is used to indicate the $i^{th}$ second vehicle to detect a surrounding second vehicle. The first vehicle determines at least one departure route from the current parking space to the exit location based on the feedback information sent by the $i^{th}$ second vehicle. The first vehicle selects the target departure route from the at least one departure route.

In the foregoing design, the first vehicle may detect all second vehicles between the current parking space and the exit location of the parking area, and then comprehensively and automatically plan at least one departure route from the current parking space to the exit location of the current parking area based on these second vehicles. This can enrich a departure route along which the first vehicle drives out of the current parking area. Further, this can also avoid a case in which a relatively large quantity of second vehicles are included in the planned at least one departure route when there are a relatively large quantity of second vehicles outside a detection range of a camera or radar of the first vehicle. Therefore, when the first vehicle selects the target departure route from the at least one departure route, a quantity of second vehicles included in the target departure route can be reduced, so that time and effort of the owner of the first vehicle may be greatly reduced. In addition, the first vehicle detects, by using the another vehicle, the another second vehicle that is not in the detection range of the first vehicle, which has a low requirement on recognition performance of the first vehicle, and has general applicability.

In a possible design, that the first vehicle selects the target departure route from the at least one departure route includes: The first vehicle determines, based on the feedback information sent by the $i^{th}$ second vehicle, a quantity of second vehicles included in each of the at least one departure route. The first vehicle selects, from the at least one departure route, a departure route that includes a minimum quantity of second vehicles as the target departure route.

In the foregoing design, the first vehicle determines, based on the received feedback information sent by the $i^{th}$ second vehicle located between the current parking space and the parking area, the quantity of second vehicles included in each of the at least one departure route, so that the first vehicle can detect the another second vehicle that is in the at least one departure route and that is not in the detection range of the first vehicle. This may improve accuracy of determining, by the first vehicle, the quantity of second vehicles included in each of the at least one departure route. In addition, the departure route that includes the minimum quantity of second vehicles is selected from the at least one departure route as the target departure route, so that time of the first vehicle to drive out of the current parking area may be reduced.

In another possible design, the feedback information is further used to feed back a distance between the $i^{th}$ second vehicle and an $(i+1)^{th}$ second vehicle. That the first vehicle selects the target departure route from the at least one departure route includes: The first vehicle determines, based on the feedback information sent by the $i^{th}$ second vehicle, a distance between second vehicles included in each of the at least one departure route. The first vehicle determines, based on the distance between the second vehicles included in each of the at least one departure route, a departure difficulty corresponding to each of the at least one departure route. The departure difficulty is used to represent a difficulty degree of the first vehicle driving out of the current parking area. The first vehicle selects, from the at least one departure route, a departure route with a lowest departure difficulty as the target departure route.

In the foregoing design, the first vehicle selects, from the at least one departure route, the departure route with the lowest departure difficulty as the target departure route. Therefore, the difficulty degree of the first vehicle driving out of the current parking area may be reduced, so that time and effort of the owner of the first vehicle may be reduced.

In a possible design, that the first vehicle determines, based on the distance between the second vehicles included in each of the at least one departure route, a departure difficulty corresponding to each of the at least one departure route includes: The first vehicle determines, based on the distance between the second vehicles included in each of the at least one departure route and based on geometric kinematics and a fuzzy theory, the departure difficulty corresponding to each of the at least one departure route.

In the foregoing design, accuracy of determining, by the first vehicle, the departure difficulty corresponding to the at least one departure route can be improved.

In a possible design, that the first vehicle detects that there is the at least one second vehicle around the current parking space includes: The first vehicle detects, by using the camera and/or the radar, that there is at least one vehicle around the current parking space, and determines a distance between the first vehicle and each of the at least one vehicle. The first vehicle determines, as the second vehicle around the current parking space, a vehicle that is in the at least one vehicle and whose distance from the first vehicle is less than or equal to a preset threshold.

In the foregoing design, the first vehicle may detect and determine, by using the camera and/or the radar, the distance between the first vehicle and the at least one vehicle around the current parking space, to recognize the second vehicle, so that the second vehicle that obstructs the first vehicle from driving out of the current parking space can be conveniently detected. This may improve accuracy of recognizing the second vehicle by the first vehicle.

In a possible design, that the first vehicle separately sends the vehicle moving request information to the at least one second vehicle includes: The first vehicle obtains owner information stored in a vehicle-mounted controller of each of the at least one second vehicle, and separately sends the vehicle moving request information to the owner of the at least one second vehicle based on the owner information corresponding to each of the at least one second vehicle.

In the foregoing design, the first vehicle may directly communicate with the second vehicle, to avoid a case in which one of the at least one second vehicle cannot receive the vehicle moving request information sent by the first vehicle because some information in the owner information of the second vehicle is incorrect (for example, contact information of the owner is incorrect). This can improve efficiency of communication between the first vehicle and the second vehicle.

In a possible design, the vehicle moving request information may include but is not limited to one or any combination of vehicle moving group chat request information, mobile call request information, and SMS message notification information.

In a possible design, the owner information may include but is not limited to a license plate identifier, owner contact information, and the like corresponding to each of the at least one second vehicle.

In a possible design, that the first vehicle obtains the map information of the current parking area includes: The first vehicle obtains the map information by using a terminal corresponding to the first vehicle. Alternatively, when the first vehicle drives into the parking area, the first vehicle sends an entry notification to a server configured to manage the parking area. The entry notification is used to notify the server to send the map information to the first vehicle. The first vehicle obtains the map information sent by the server.

In the foregoing design, the first vehicle may automatically obtain the map information of the current parking area, and the owner of the first vehicle does not need to perform a manual operation to obtain the map information of the parking area. This better reduces time of the owner.

According to a second aspect, an embodiment of this application provides a first vehicle. The first vehicle has a function of implementing the method according to any one of the first aspect or the possible designs of the first aspect. The function may be implemented by hardware, or by hardware by executing corresponding software. The hardware or the software includes one or more modules corresponding to the function, for example, a transceiver unit and a processing unit.

In a possible design, the first vehicle may alternatively be a chip or an integrated circuit.

In a possible design, the first vehicle may include a memory and a processor. The memory is configured to store a program executed by the processor. When the program is executed by the processor, the first vehicle may perform the method according to any one of the first aspect or the possible designs of the first aspect.

According to a third aspect, an embodiment of this application provides a first vehicle, including at least one processor and a memory. The memory stores one or more computer programs. When the one or more computer programs stored in the memory are executed by the at least one processor, the first vehicle is enabled to implement the method according to any one of the first aspect or the possible designs of the first aspect.

According to a fourth aspect, an embodiment of this application provides a computer-readable storage medium. The computer-readable storage medium includes a computer program. When the computer program is run on a computer, the computer is enabled to perform the method according to any one of the first aspect or the possible designs of the first aspect.

According to a fifth aspect, an embodiment of this application provides a program product. When the program product is run on a computer, the computer is enabled to perform the method according to any one of the first aspect or the possible designs of the first aspect.

According to a sixth aspect, an embodiment of this application provides a chip. The chip may be coupled to a memory in a first vehicle, and is configured to invoke a computer program stored in the memory and perform the method according to any one of the first aspect and the possible designs of the first aspect.

For advantageous effects of the second aspect to the sixth aspect and the possible designs of the second aspect to the sixth aspect, refer to the foregoing descriptions of the advantageous effects of the method according to any one of the first aspect and the possible designs of the first aspect.

BRIEF DESCRIPTION OF DRAWINGS

FIG. 2 is a schematic flowchart of a vehicle moving method according to an embodiment of this application;

DESCRIPTION OF EMBODIMENTS

To make the objectives, technical solutions, and advantages of this application clearer, the following describes the technical solutions of embodiments of this application in detail with reference to the accompanying drawings in embodiments of this application.

Before embodiments of this application are described, some terms in this application are first described, to help a person skilled in the art have a better understanding.

(1) In embodiments of this application, a first vehicle is a vehicle that is to drive out (that is, about to drive out) of a current parking area. One or more of the following apparatuses in the first vehicle may be configured to perform a related procedure of a vehicle moving method provided in embodiments of this application, for example, a telematics box (T-Box), a domain controller (DC), a multi-domain controller (MDC), an on board unit (OBU), or an Internet of vehicles chip. In embodiments of this application, an apparatus that is in the first vehicle and that is configured to perform the related procedure of the vehicle moving method provided in embodiments of this application may also be referred to as a vehicle-mounted controller.

(2) In embodiments of this application, a parking area may be an area in which vehicles are centrally parked, for example, an area such as a parking lot in a shopping mall, an enterprise, or a residential area.

(3) A server that manages a parking area may be an Internet of vehicles platform or a server that manages the parking area and provides a service, and includes an application server or a map cloud server that provides a service for a high-definition map and a navigation map. A specific deployment mode of the server is not limited in this application. Specifically, the server may be deployed in a cloud, or may be an independent computer device, a chip, or the like. A vehicle located in the parking area may obtain, from the server, map information corresponding to the parking area.

In addition, it should be understood that the terms "system" and "network" may be used interchangeably in embodiments of this application. "Carrying" may mean that a message is used to carry information or data, or may mean that a message includes information. "Coupling" may mean that two components are directly or indirectly combined with each other.

The following describes in detail embodiments of this application with reference to the accompanying drawings.

Figure 1:
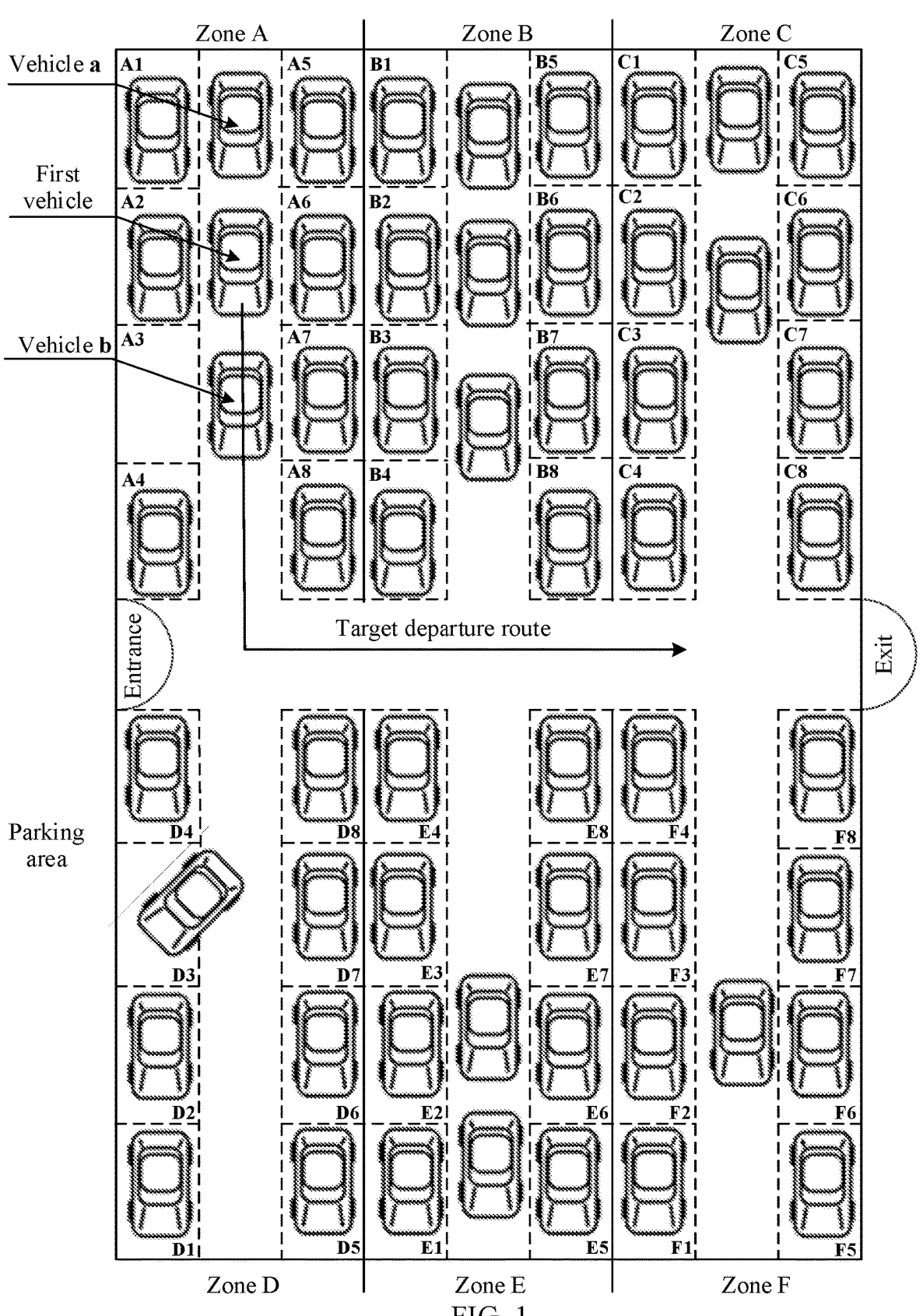
FIG. 1 is a schematic diagram of an application scenario to which an embodiment of this application is applicable.

FIG. 1 is a schematic diagram of an application scenario to which an embodiment of this application is applicable. In this application scenario, a parking area may include a plurality of parking spaces, and one vehicle may be parked at each parking space. As car parc increases, to meet a parking space requirement as much as possible, a passage other than a main passage (namely, a passage between an entrance and an exit of the parking area) in the parking area is usually relatively narrow, to increase an area of the parking space and increase a quantity of parking spaces in each parking area. As shown in FIG. 1, a parking area may be divided into a plurality of parking zones based on a building structure, for example, a zone A, a zone B, a zone C, a zone D, a zone E, and a zone F (where a solid line represents a physical building, such as a wall) in FIG. 1. A passage in each parking area is relatively narrow (for example, a width of the passage allows only one vehicle to pass through each time), to increase the area of the parking space in each parking area. This can increase the quantity of parking spaces in each parking area, to meet the parking space requirement.

Generally, a vehicle is easily blocked by another vehicle and cannot drive out of a parking area because usage of parking spaces in the parking area increases, vehicles are parked randomly, or the like. For example, as shown in FIG. 1, a first vehicle located in the zone A is parked on a passage of the zone A because all parking spaces in the parking area are used before the first vehicle is parked. However, vehicles are parked around a current parking space of the first vehicle. For example, vehicles parked at parking spaces A2, A6, and A7, a vehicle a, and a vehicle b are parked around the current parking space of the first vehicle. Therefore, the first vehicle cannot drive out of the current parking place due to obstruction of the surrounding vehicles, and therefore cannot drive out of the current parking area. Alternatively, refer to the zone D in FIG. 1. Because a vehicle parked at a parking space D3 is not correctly parked at the parking space D3, and occupies a passage in the zone D, vehicles parked at parking spaces D1, D2, D5, and D6 cannot drive out of the current parking area.

It can be learned from the foregoing content that when the first vehicle is obstructed from driving out of the current parking area, an owner of the first vehicle can only go to the parking area to request, by telephone, an owner of at least one second vehicle that blocks the first vehicle from driving out of the current parking area, to vacate the space. As a result, it takes relatively long time for the first vehicle to drive out of the current parking area, and time and effort of the owner of the first vehicle are wasted.

To resolve the foregoing problem, in this embodiment of this application, based on an Internet of vehicles technology, vehicles may communicate with each other, to form an Internet of vehicles system. As shown in FIG. 1, all vehicles located in the parking area may form the Internet of vehicles system. In the Internet of vehicles system, each first vehicle may obtain map information of a parking area, and may determine a current parking space and an exit location of the parking area based on the map information. Then, each first vehicle may determine a target departure route from the current parking space to the exit location based on the current parking space and the exit location.

When the owner of the first vehicle is located at the driver's seat of the first vehicle and the first vehicle is obstructed by another vehicle or another obstacle (for example, a wall) in the current parking area, the owner of the first vehicle cannot clearly know whether there is an obstacle vehicle in the target departure route, namely, a vehicle (also referred to as a second vehicle in this embodiment of this application) that obstructs the first vehicle from driving from the current parking space to the exit location of the current parking area. Alternatively, if the owner of the first vehicle has planned the target departure route before entering the parking area, when the owner of the first vehicle does not enter the current parking area for relatively long time, the owner of the first vehicle cannot clearly know whether there is the second vehicle in the target departure route. Therefore, in the Internet of vehicles system, each first vehicle may further determine whether there is at least one second vehicle in the target departure route. When a first vehicle determines that there is the at least one second vehicle in the target departure route, the first vehicle may synchronously send vehicle moving request information to the owner of the at least one second vehicle included in the target departure route, to request the at least one second vehicle to move.

For example, as shown in FIG. 1, the first vehicle in the zone A is used as an example. The first vehicle may obtain map information of the current parking area, and may determine a current parking space and an exit location of the parking area based on the map information. Then, the first vehicle may determine the target departure route from the current parking space to the exit location based on the current parking space and the exit location. In addition, the first vehicle may further determine whether there is the at least one second vehicle in the target departure route. For example, as shown in FIG. 1, the first vehicle may determine that there is a second vehicle, namely, a vehicle b, in the target departure route. Then, the first vehicle may send the vehicle moving request information to an owner of the vehicle b, to request the vehicle b to move.

In this embodiment of this application, the first vehicle may obtain the map information of the current parking area and automatically plan the target departure route from the current parking space to the exit location of the parking area. The owner of the first vehicle does not need to go to the parking area to plan the departure route corresponding to the first vehicle. Therefore, time of the owner of the first vehicle to plan the departure route of the first vehicle may be reduced. Further, the first vehicle may further determine whether there is the at least one second vehicle in the target departure route. When determining that there is the at least one second vehicle in the target departure route, the first vehicle may separately send the vehicle moving request information to the owner of the at least one second vehicle, to request the at least one second vehicle to move. The owner of the first vehicle does not need to go to the parking area to request, by telephone, the owner of the second vehicle included in a planned departure route to vacate the space. Therefore, time consumed by the first vehicle to drive out of the current parking area may be reduced, so that time and effort of the owner of the first vehicle are reduced.

The following specifically describes a preparation process before the first vehicle drives out of the current parking area. In the following embodiments of this application, "at least one" means one or more, and "a plurality of" means two or more than two. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural. The singular forms "one", "a", "the", "the foregoing", "this", and "the one" are also intended to include, for example, "one or more", unless otherwise specified in the context clearly. Unless otherwise stated, ordinal numbers such as "first" and "second" mentioned in embodiments of this application are intended to distinguish a plurality of objects, rather than limit an order, a time sequence, priorities, or importance degrees of the plurality of objects. For example, the first vehicle and the second vehicle are merely used to distinguish different vehicles, but do not indicate different priorities, importance degrees, or the like of the two vehicles.

Reference to "an embodiment", "some embodiments", or the like described in the specification of this application indicates that one or more embodiments of this application include a specific feature, structure, or characteristic described with reference to those embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

FIG. 2 is a schematic flowchart of a vehicle moving method according to an embodiment of this application. The method is applicable to the application scenario shown in FIG. 1 or a similar application scenario. This is not limited in this embodiment of this application. As shown in FIG. 2, the method includes the following steps.

S201: A first vehicle obtains map information of a current parking area, and determines a current parking space and an exit location of the parking area based on the map information.

In some embodiments, there may be a plurality of manners in which the first vehicle obtains the map information of the current parking area.

Figure 3A:
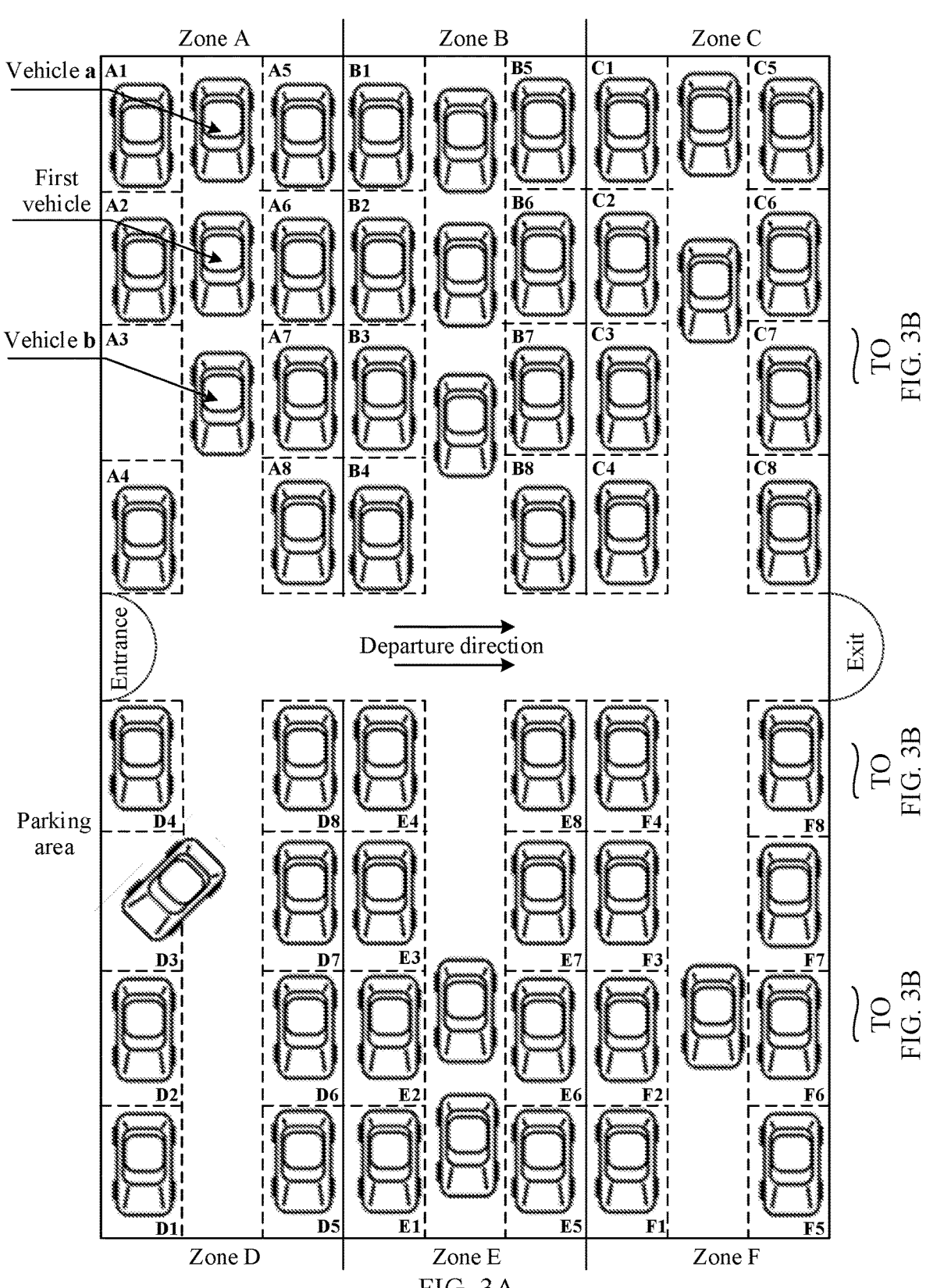
FIG. 3A and FIG. 3B are a schematic diagram of a structure of an applicable Internet of vehicles system according to an embodiment of this application.
Figure 3B:
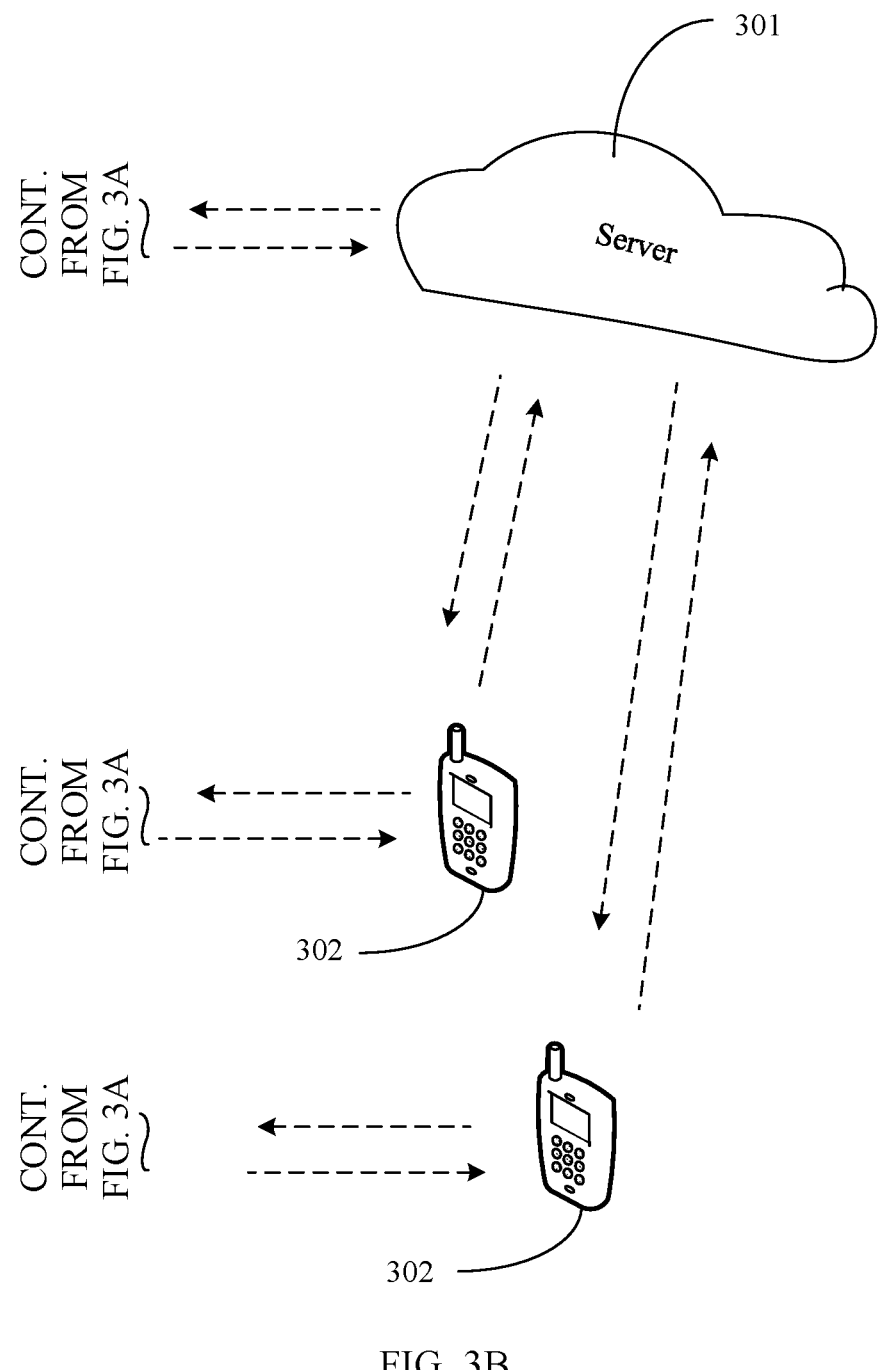

Example 1: When driving into a parking area, the first vehicle may send an entry notification to a server configured to manage the parking area. Then, the first vehicle may obtain the map information that is of the parking area and that is sent by the server. FIG. 3A and FIG. 3B are a schematic diagram of a structure of an applicable Internet of vehicles system according to this embodiment of this application. The Internet of vehicles system relates to vehicles in a parking area, and further relates to a server 301 that manages the parking area. The server 301 is configured to provide a navigation, intelligent driving, or automatic driving service for the vehicles in the parking area. In addition, the Internet of vehicles system may further relate to devices such as terminals 302 that communicate with the vehicles in the parking area and the server. The terminal 302 may be any device that can perform communication, such as a mobile phone or a tablet computer. This is not specifically limited herein. The terminals 302 are usually electronic devices that are carried by owners of the vehicles and that are used for communication. When a vehicle-mounted controller of the first vehicle detects that the first vehicle enters a range of the parking area, the first vehicle automatically sends the entry notification to the server 301, or sends the entry notification to the server 301 by swiping, in a preset area at an entrance of the parking area, an electronic card used to pass the parking area. This is not limited in this embodiment of this application. After receiving the entry notification, the server may send the map information of the parking area to the first vehicle.

Certainly, in Example 1, the first vehicle may alternatively send a departure notification to the server that manages the parking area when the first vehicle is about to drive out of the current parking area. For example, still refer to FIG. 3A and FIG. 3B. When the vehicle-mounted controller of the first vehicle detects that interval duration between current start time and last start time of the first vehicle exceeds preset duration (for example, one hour), the first vehicle automatically sends the departure notification to the server 301. Then, the first vehicle may obtain the map information that corresponds to the parking area and that is sent by the server to the first vehicle based on the departure notification.

In Example 1, the first vehicle may automatically obtain the map information of the current parking area. An owner of the first vehicle does not need to perform a manual operation to obtain the map information of the parking area. This better reduces time of the owner of the first vehicle.

Example 2: A terminal corresponding to the first vehicle may send indication information to a server that manages a current parking area, to indicate the server to send the map information of the parking area to the first vehicle. The indication information may carry identification information of the first vehicle, for example, a license plate number of the first vehicle or a network address corresponding to the first vehicle. For example, still refer to FIG. 3A and FIG. 3B. Before the owner of the first vehicle arrives at the parking space of the first vehicle, the owner of the first vehicle may send the indication information to the server 301 by using the terminal 302. After receiving the indication information, the server 301 sends the map information of the parking area to the first vehicle.

In Example 2, before being started, the first vehicle may receive the map information that is of the parking area that is sent by the server configured to manage the current parking area. Therefore, time of the first vehicle from obtaining the map information of the current parking area to driving out of the parking area may be reduced, so that time of the owner is reduced.

Example 3: The first vehicle may obtain the map information that is sent by the terminal corresponding to the first vehicle and that is of the current parking area. For example, still refer to FIG. 3A and FIG. 3B. Before the owner of the first vehicle arrives at the current parking space of the first vehicle, the owner of the first vehicle may search for the map information of the parking area by using the terminal 302 and the server 301, and send the map information of the parking area to the first vehicle by using the terminal 302.

In Example 3, before being started, the first vehicle may receive the map information that is sent by the terminal corresponding to the first vehicle and that is of the current parking area. Therefore, time of the first vehicle from obtaining the map information of the parking area to driving out of the parking area may be reduced, so that time of the owner of the first vehicle is reduced.

Certainly, the foregoing examples 1 to 3 may be alternatively used in combination in a specific implementation process. This is not limited in this embodiment of this application.

In this embodiment of this application, manners in which the first vehicle obtains the map information of the current parking area are relatively diversified, so that different requirements of owners can be met, limitations of the manner in which the first vehicle obtains the map information of the parking area can be extended, and experience of the owners can be improved.

S202: The first vehicle determines a target departure route from the current parking space to the exit location based on the current parking space and the exit location.

In some embodiments, the first vehicle may detect whether there is at least one vehicle around the current parking space. For example, the first vehicle may detect, by using a camera and/or a radar installed on the first vehicle, whether there is the at least one vehicle around the current parking space. When the first vehicle detects, by using the camera and/or the radar, that there is the at least one vehicle around the current parking space, the first vehicle may further determine a distance between the first vehicle and the at least one vehicle. Then, the first vehicle may determine, as a second vehicle around the current parking space, a vehicle that is in the at least one vehicle and whose distance from the first vehicle is less than or equal to a preset threshold. In a specific implementation process, the preset threshold may be set to a body width of the first vehicle.

Figure 4:
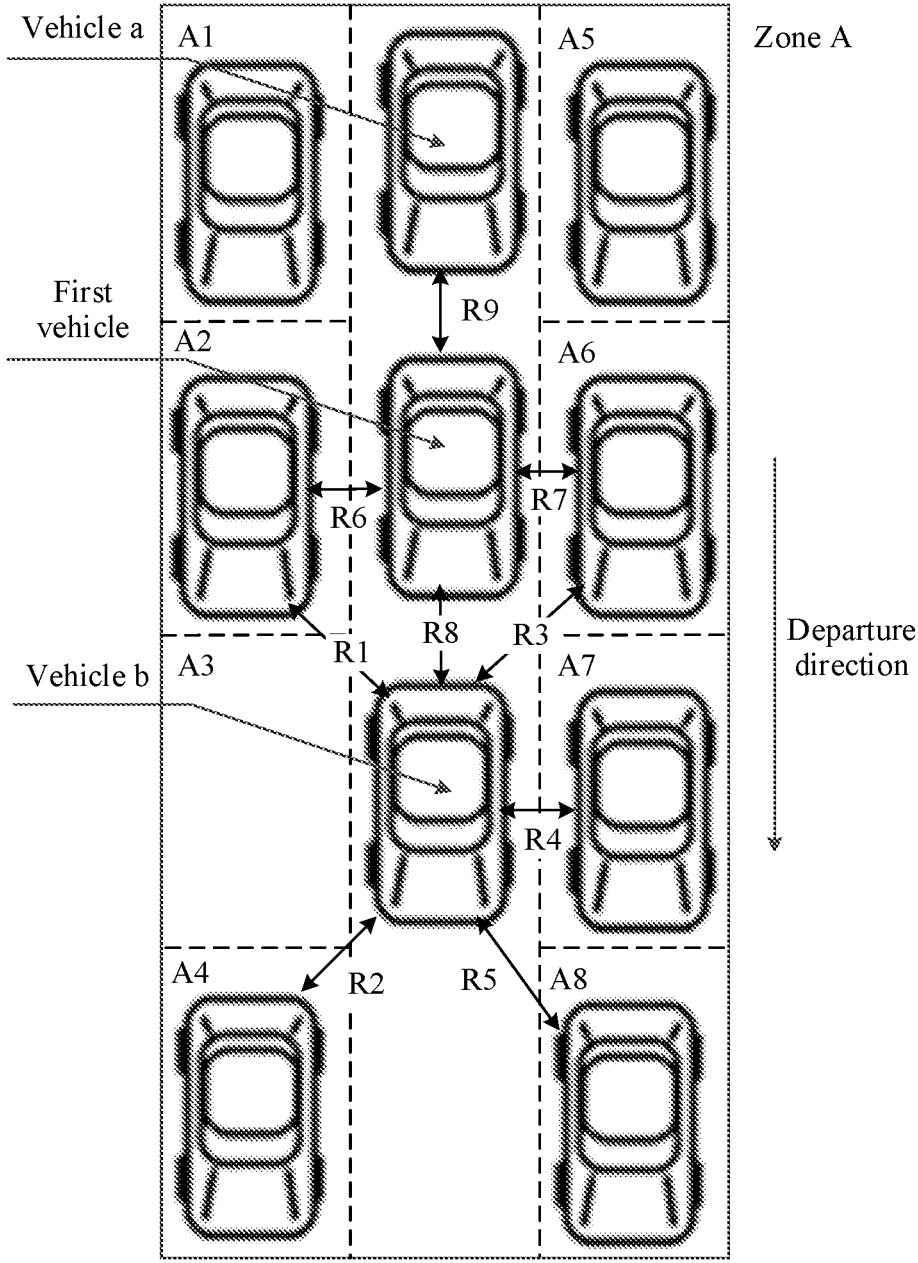
FIG. 4 is a part of the schematic diagram shown in FIG. 1 or FIG. 3A and FIG. 3B.
Figure 5:
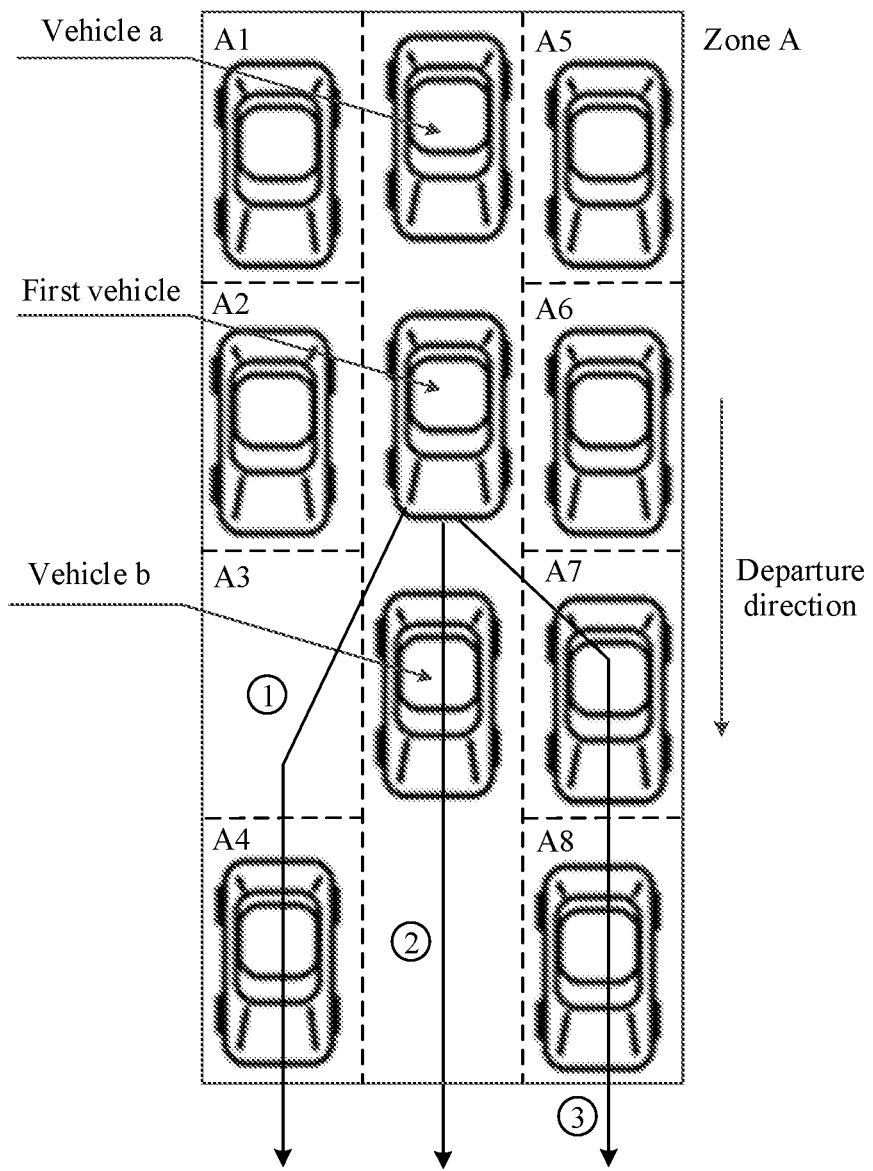
FIG. 5 is a part of the schematic diagram shown in FIG. 1 or FIG. 3A and FIG. 3B.

For example, with reference to FIG. 1 and FIG. 4 or with reference to FIG. 3A, FIG. 3B, and FIG. 4, the first vehicle in the zone A is still used as an example. It is assumed that the first vehicle detects that vehicles around the current parking space are vehicles parked at the parking spaces A2, A6, and A7, the vehicle a, and the vehicle b. A distance between the first vehicle and the vehicle a is R9. A distance between the first vehicle and the vehicle parked at the parking space A2 is R6. A distance between the first vehicle and the vehicle parked at the parking space A6 is R7. A distance between the first vehicle and the vehicle b is R8. A distance between the first vehicle and the vehicle parked in the parking space A7 is R10 (not shown in FIG. 4). In this case, the first vehicle may determine, as the second vehicle, a vehicle corresponding to a distance that is in R6, R7, R8, R9, and R10 and that is less than or equal to the preset threshold. For example, R6, R7, R8, and R9 in R6, R7, R9, and R10 are less than or equal to the preset threshold. Because the vehicle a is not in a departure direction of the first vehicle, the first vehicle may not consider the vehicle a when detecting the second vehicle around the current parking space. Therefore, the first vehicle may determine vehicles parked at the parking spaces A2 and A6 and the vehicle b as the second vehicles.

In this embodiment of this application, types of the radar and the camera are not specifically limited. For example, the radar may include but is not limited to an infrared radar, an ultrasonic radar, a millimeter-wave radar, a mechanical rotating laser radar, a solid-state laser radar, and the like. The camera may be a vehicle-mounted multi-function camera, including but not limited to a complementary metal-oxide semiconductor (CMOS) camera and a charge coupled device (CCD) camera.

In this embodiment of this application, the first vehicle may detect and determine, by using the camera and/or the radar, the distance between the first vehicle and the at least one vehicle around the current parking space, to recognize the second vehicle, so that the second vehicle that obstructs the first vehicle from driving out of the current parking space can be conveniently detected. This may improve accuracy of recognizing the second vehicle by the first vehicle.

In some embodiments, after detecting that there is at least one second vehicle around the current parking space, the first vehicle may determine the target departure route from the current parking space to the exit location based on the at least one second vehicle around the current parking space and the exit location of the current parking area. In a specific implementation process, a specific embodiment in which the first vehicle determines the target departure route from the current parking space to the exit location based on the at least one second vehicle around the current parking space and the exit location of the current parking area may be as follows.

In Embodiment 1, the first vehicle may determine at least one departure route from the current parking space to the exit location based on the at least one second vehicle around the current parking space and the exit location of the current parking area. Then, the first vehicle may select one of the at least one departure route as the target departure route.

For example, with reference to FIG. 1, FIG. 4, and FIG. 5 or FIG. 3A to FIG. 5, the first vehicle in the zone A is still used as an example. The first vehicle may determine the departure direction of the first vehicle based on the current parking space and the exit location of the current parking area. Then, the first vehicle may determine the at least one departure route from the current parking space to the exit location based on the departure direction of the parking area and at least one vehicle around the current parking space. For example, the first vehicle detects that second vehicles around the current parking space are vehicles parked at the parking spaces A2 and A6, the vehicle a, and the vehicle b. In a specific implementation process, because the vehicles parked at the parking spaces A2 and A6 and the vehicle a are not in the departure direction of the first vehicle, the first vehicle may not consider these vehicles when planning a departure route from the current parking space to the exit location of the current parking area. Therefore, the first vehicle may plan three departure routes from the current parking space to the exit location based on the vehicle b, for example, a departure route 1, a departure route 2, and a departure route 3 in FIG. 5. Then, the first vehicle may select one of the three departure routes as the target departure route.

In this embodiment, the first vehicle may automatically determine the at least one departure route from the current parking space of the first vehicle to the exit location based on the exit location of the current parking area and the detected at least one second vehicle around the current parking space. The owner of the first vehicle does not need to go to the parking area to plan the departure route of the first vehicle. This can enrich the departure route along which the first vehicle drives out of the current parking area. In addition, this can avoid a disadvantage generated when the departure route of the first vehicle is determined only based on map information of the current parking area, for example, when the first vehicle uses a navigation function based on the map information of the parking area but the navigation is inaccurate, the first vehicle cannot correctly plan the departure route or the planned departure route is relatively complex, which wastes a large amount of time and effort of the owner of the first vehicle.

In Embodiment 2, the first vehicle first detects all second vehicles between the current parking space and the exit location of the current parking area. The first vehicle determines the at least one departure route from the current parking space to the exit location based on all second vehicles between the current parking space and the exit location of the current parking area. Then, the first vehicle may select the target departure route from the at least one departure route.

For example, after the first vehicle detects that there is the at least one second vehicle around the current parking space, the first vehicle may detect, by using the at least one second vehicle around the current parking space and an $i^{th}$ vehicle, another second vehicle located between the at least one second vehicle around the current parking space and the exit location. The $i^{th}$ second vehicle is a vehicle in the another second vehicle, wherein i is an integer greater than or equal to 1. Then, the first vehicle may receive feedback information sent by the $i^{th}$ second vehicle. The feedback information is used to feed back a parking space of an $(i+1)^{th}$ second vehicle.

Figure 6:
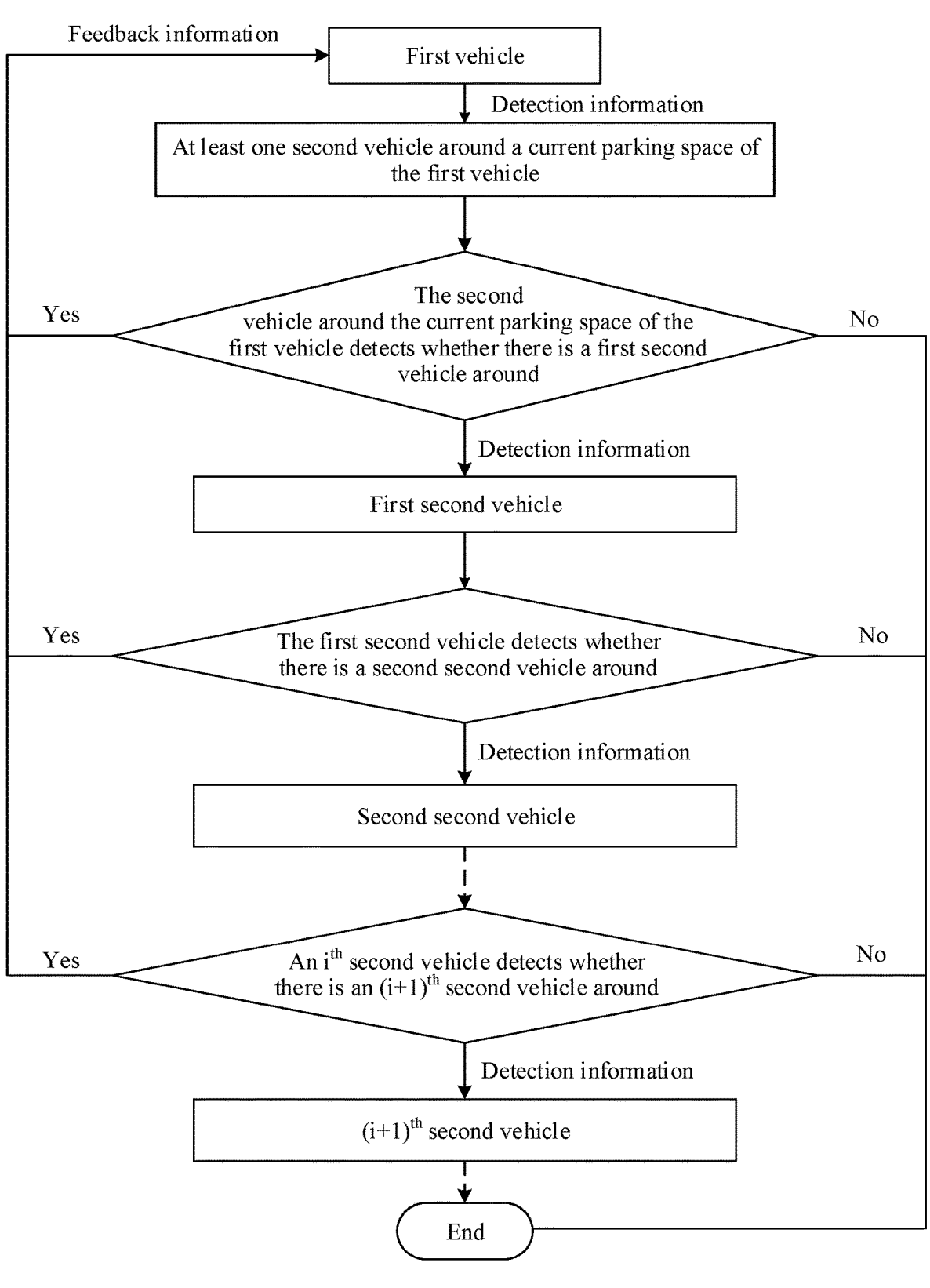
FIG. 6 is a schematic flowchart in which a first vehicle detects all second vehicles between a current parking space and an exit location of a current parking area and to which an embodiment of this application is applicable.

For example, FIG. 6 is a schematic flowchart in which the first vehicle detects all second vehicles between the current parking space and the exit location of the current parking area and to which this embodiment of this application is applicable. As shown in FIG. 6, when i is equal to 1, feedback information of a first second vehicle is sent by the first second vehicle after the first second vehicle receives detection information forwarded by the at least one second vehicle around the current parking space of the first vehicle. When i is greater than 1, feedback information of the $(i+1)^{th}$ second vehicle is sent by the $(i+1)^{th}$ second vehicle after the $(i+1)^{th}$ second vehicle receives detection information forwarded by the $i^{th}$ second vehicle. The detection information is sent by the first vehicle and that is used to request the $i^{th}$ second vehicle to detect a surrounding second vehicle. The preceding operations are repeated until detection of all second vehicles between the current parking space and the exit location of the current parking area is completed. Then, the first vehicle may determine the at least one departure route from the current parking space to the exit location based on the feedback information sent by the $i^{th}$ second vehicle, and may select the target departure route from the at least one departure route.

For example, with reference to FIG. 1, FIG. 4, and FIG. 7, or FIG. 3A, FIG. 3B, FIG. 4, and FIG. 7, the first vehicle in the zone A is still used as an example. For example, after detecting the at least one second vehicle around the current parking space, the first vehicle may first send the detection information to the at least one second vehicle around the current parking space, to indicate the at least one second vehicle around the current parking space to separately detect information about a surrounding second vehicle. For example, after the first vehicle detects that second vehicles around the current parking space are vehicles at the parking spaces A2 and A6, the vehicle a, and the vehicle b, because the vehicle a is not in the departure direction of the first vehicle, the first vehicle may not consider the vehicle a when planning a departure route from the current parking space to the exit location of the parking area. Therefore, the first vehicle separately sends the detection information to the vehicles at the parking spaces A2 and A6 and the vehicle b, to indicate the vehicles at the parking spaces A2 and A6 and the vehicle b to separately recognize information about a surrounding second vehicle.

Then, after receiving the detection information, the vehicles at the parking spaces A2 and A6 and the vehicle b separately recognize whether there is a second vehicle around. When detecting that there are second vehicles around, the vehicles at the parking spaces A2 and A6, the vehicle a, and the vehicle b separately send feedback information to the first vehicle, to feed back a parking space of the $i^{th}$ second vehicle to the first vehicle, and further forward the detection information to the $(i+1)^{th}$ second vehicle. In this case, i is equal to 1. For example, after detecting that surrounding second vehicles are vehicles at parking spaces A4 and A7, the vehicle b sends the feedback information to the first vehicle, to feed back to the first vehicle, that the detected parking spaces of the surrounding second vehicles are separately the parking space A4 and the parking space A7, and separately forward the detection information to the vehicles at the parking space A4 and the parking space A7.

Then, after receiving the detection information, the vehicles at the parking space A4 and the parking space A7 separately recognize whether there is the second vehicle around. When detecting second vehicles around, the vehicles at the parking space A4 and the parking space A7 separately send the feedback information to the first vehicle, to feed back a parking space of the $i^{th}$ second vehicle to the first vehicle, and further forward the detection information to the $(i+1)^{th}$ second vehicle. In this case, i is equal to 2.

The preceding operations are repeated until detection of all second vehicles between the current parking space and the exit location of the current parking area is completed. Then, the first vehicle may determine the at least one departure route from the current parking space to the exit location based on the feedback information sent by the $i^{th}$ second vehicle. Specifically, the first vehicle may determine parking spaces of all second vehicles between the current parking space and the exit location of the current parking area based on the feedback information sent by the $i^{th}$ second vehicle. Then, the first vehicle may determine the at least one departure route from the current parking space to the exit location based on the parking spaces of all second vehicles between the current parking space and the exit location of the current parking area. Then, the first vehicle may select the target departure route from the at least one departure route, for example, departure routes 1 to 5 in FIG. 7. Then, the first vehicle may select one of the five departure routes as the target departure route.

For a manner in which the $i^{th}$ second vehicle detects the surrounding second vehicle, refer to the foregoing manner in which the first vehicle detects the at least one second vehicle around the current parking space. Details are not described herein again.

Optionally, in Embodiment 2, the first vehicle may determine, in a plurality of manners, that there is no second vehicle around the $i^{th}$ second vehicle. For example, if the first vehicle receives the feedback information sent by the $i^{th}$ second vehicle, the first vehicle determines that there is no second vehicle around the $i^{th}$ second vehicle. The prompt information is used to indicate that there is no second vehicle around the $i^{th}$ second vehicle. Alternatively, when the first vehicle does not receive, within specified duration (for example, one minute), the feedback information sent by the $i^{th}$ second vehicle, the first vehicle determines that there is no second vehicle around the $i^{th}$ second vehicle. In the two manners, time of the first vehicle to detect the another second vehicle located between the at least one second vehicle around the current parking space and the exit location may be reduced. Further, time of the first vehicle to plan the at least one departure route from the current parking space to the exit location of the first area may be reduced, so that time of the first vehicle to drive out of the current parking area may be reduced.

In this embodiment, the first vehicle may detect all second vehicles between the current parking space and the exit location of the parking area, and then comprehensively and automatically plan the at least one departure route from the current parking space to the exit location of the current parking area based on these second vehicles. This can enrich a departure route along which the first vehicle drives out of the current parking area. Further, this can also avoid a case in which a relatively large quantity of second vehicles are included in some or all of the planned at least one departure route when there are a relatively large quantity of second vehicles outside a detection range of a camera or radar of the first vehicle. Therefore, when the first vehicle selects the target departure route from the at least one departure route, a quantity of second vehicles included in the target departure route can be reduced, so that time and effort of the owner of the first vehicle may be greatly reduced. In addition, the first vehicle detects, by using the another vehicle, the another second vehicle that is not in the detection range of the first vehicle, which has a low requirement on recognition performance of the first vehicle, and has general applicability.

Figure 8:
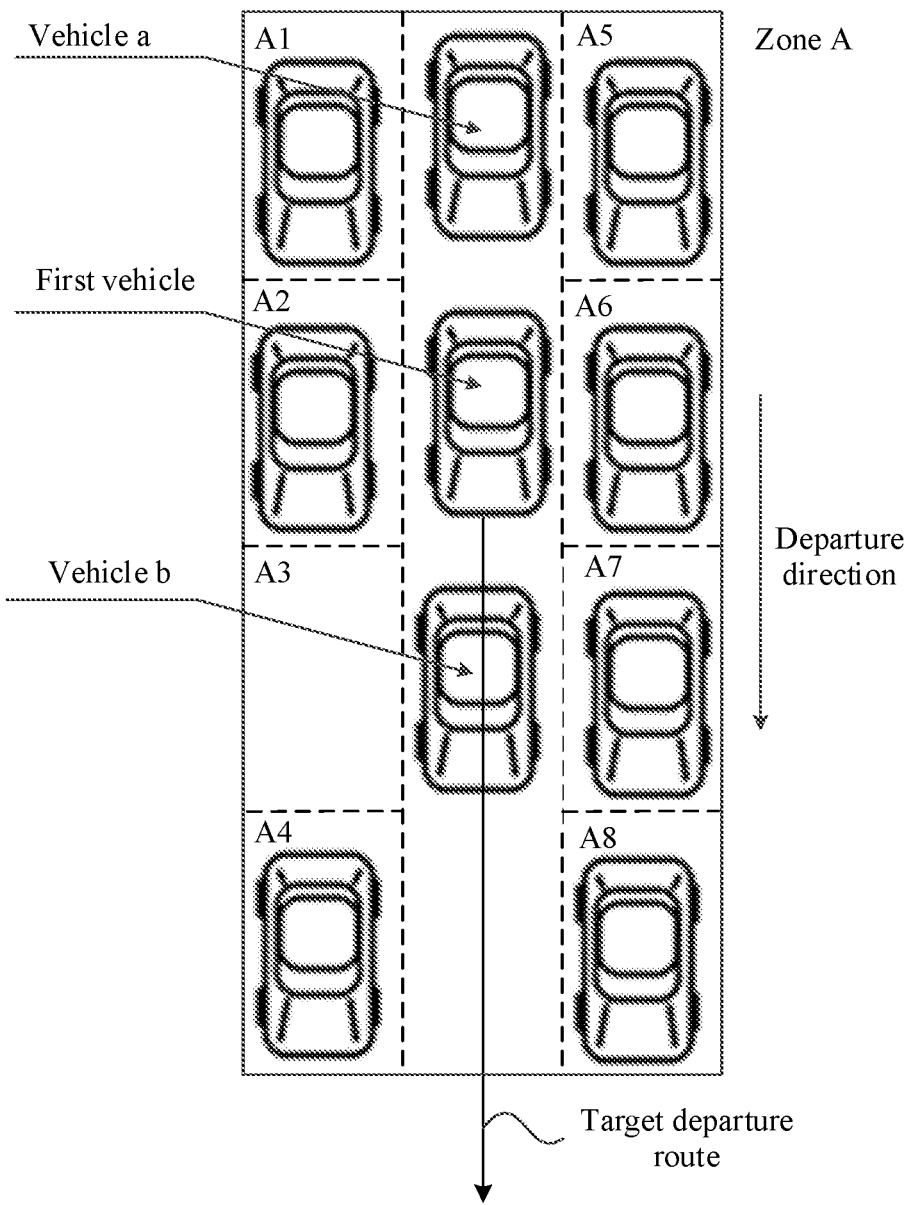
FIG. 8 is a part of the schematic diagram shown in FIG. 1 or FIG. 3A and FIG. 3B.

In Embodiment 3, the first vehicle may determine the target departure route from the current parking space to the exit location based on the at least one second vehicle around the current parking space and the exit location of the current parking area. For example, as shown in FIG. 8, after detecting that the second vehicles around the current parking space are vehicles at the parking spaces A2 and A6, the vehicle a, and the vehicle b, the first vehicle may determine, based on the vehicles at the parking spaces A2 and A6, the vehicle a, and the vehicle b, only one departure route as the target departure route.

In this embodiment, the first vehicle may automatically determine the target departure route from the current parking space of the first vehicle to the exit location based on the exit location of the current parking area and the detected at least one second vehicle around the current parking space. Therefore, the owner of the first vehicle does not need to go to the parking area to plan the departure route of the first vehicle.

In addition, this can avoid a disadvantage generated when the departure route of the first vehicle is determined only based on the map information of the current parking area, for example, when the first vehicle uses a navigation function based on the map information of the parking area but the navigation is inaccurate, the first vehicle cannot correctly plan the departure route or the planned departure route is complex, which wastes a large amount of time and effort of the owner of the first vehicle.

In Embodiment 4, the first vehicle may first detect all second vehicles between the current parking space and the exit location of the current parking area, and then determine one departure route as the target departure route based on all second vehicles between the current parking space and the exit location of the current parking area. For example, as shown in FIG. 8, after detecting that all second vehicles between the current parking space and the current parking area are vehicles at the parking spaces A2, A4, A6, A7, and A8, the vehicle a, and the vehicle b, the first vehicle may determine, based on the vehicles at the parking spaces A2, A4, A6, A7, and A8, the vehicle a, and the vehicle b, one departure route as the target departure route. In this embodiment, for an implementation in which the first vehicle detects all second vehicles between the current parking space and the exit location of the current parking area, refer to Embodiment 2. Details are not described herein again.

In this embodiment, the first vehicle may automatically determine the target departure route from the current parking space of the first vehicle to the exit location based on all second vehicles between the current parking space and the exit location of the current parking area. Therefore, the owner of the first vehicle does not need to go to the parking area to plan the departure route of the first vehicle. In addition, this can avoid a disadvantage generated when the departure route of the first vehicle is determined only based on the map information of the parking area, so that time and effort of the owner of the first vehicle may be reduced.

In some embodiments, when the first vehicle determines the at least one departure route from the current parking space to the exit location of the current parking space, the first vehicle may select the target departure route from the at least one departure route in the following plurality of manners.

Example 1: The first vehicle may determine, based on the received feedback information sent by the $i^{th}$ second vehicle located between the current parking space and the exit location of the current parking area, a quantity of second vehicles included in each of the at least one departure route. Then, the first vehicle may select, from the at least one departure route, a departure route that includes a minimum quantity of second vehicles as the target departure route. A manner in which the first vehicle receives the feedback information sent by the $i^{th}$ second vehicle located between the current parking space and the current parking area is the same as or similar to that in Embodiment 2. Details are not described herein again.

Figure 7:
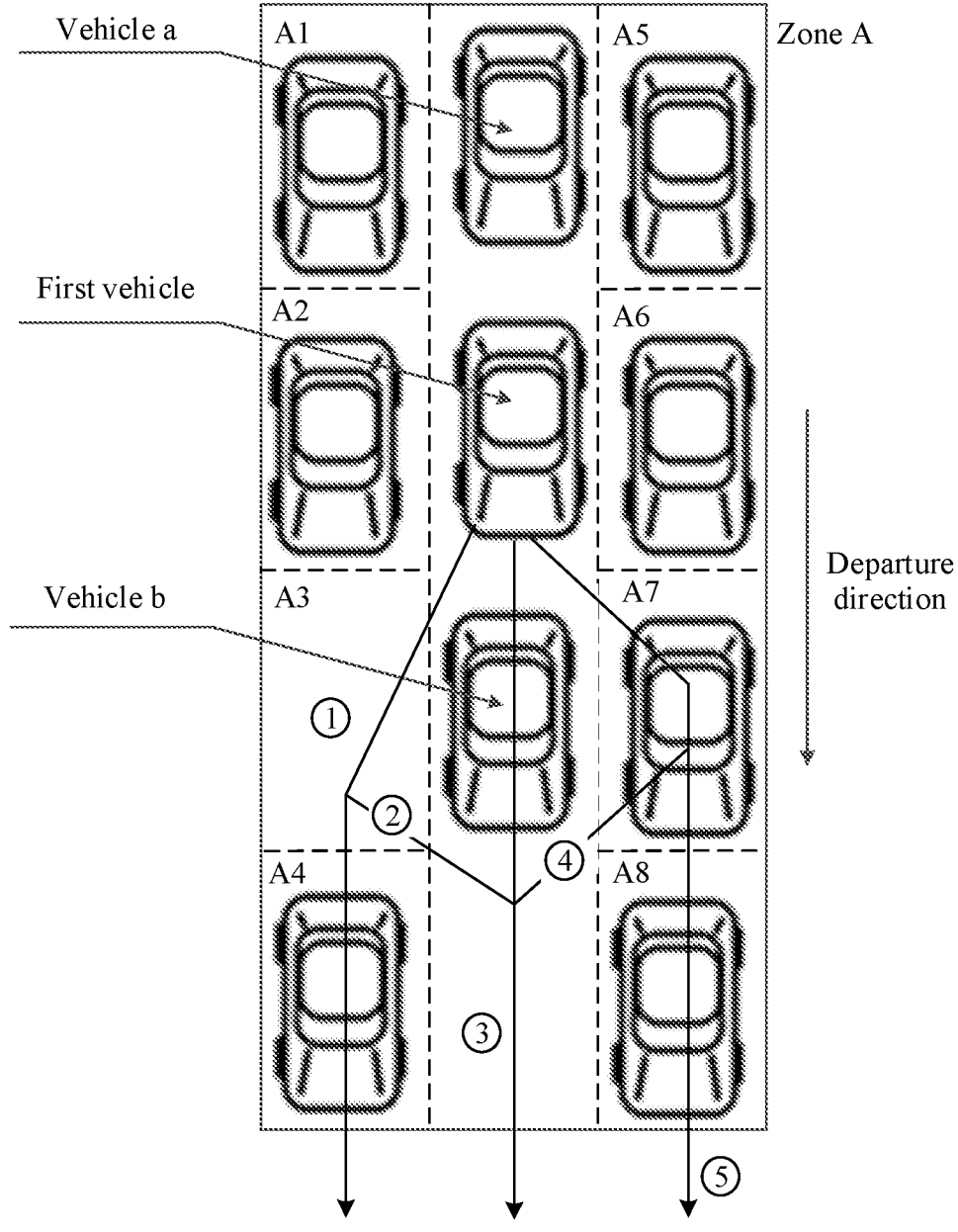
FIG. 7 is a part of the schematic diagram shown in FIG. 1 or FIG. 3A and FIG. 3B.

For example, as shown in FIG. 7, when quantities of second vehicles included in the departure routes 1 to 5 are a quantity of second vehicles included in a departure route 3<a quantity of second vehicles included in a departure route 1<a quantity of second vehicles included in a departure route 2<a quantity of second vehicles included in a departure route 5<a quantity of second vehicles included in a departure route 4, the first vehicle may select the departure route 3 as the target departure route.

In this example, the first vehicle determines, based on the received feedback information sent by the $i^{th}$ second vehicle located between the current parking space and the parking area, a quantity of second vehicles included in each of the at least one departure route, so that the first vehicle can detect the another second vehicle that is in the at least one departure route and that is not in the detection range of the first vehicle. This may improve accuracy of determining, by the first vehicle, the quantity of second vehicles included in each of the at least one departure route. In addition, the departure route that includes the minimum quantity of second vehicles is selected from the at least one departure route as the target departure route. Therefore, time of the first vehicle to drive out of the current parking area may be reduced.

Example 2: The first vehicle determines, based on the received feedback information sent by the $i^{th}$ second vehicle located between the current parking space and the parking area, a distance between second vehicles included in each of the at least one departure route. Then, the first vehicle may determine, based on the distance between the second vehicles included in each of the at least one departure route, a departure difficulty corresponding to each of the at least one departure route. The feedback information sent by the $i^{th}$ second vehicle may be used to feed back a parking space of the $(i+1)^{th}$ second vehicle, and may be further used to feed back a distance between the $i^{th}$ second vehicle and the $(i+1)^{th}$ second vehicle. The departure difficulty is used to represent a difficulty degree of the first vehicle driving out of the parking area.

Optionally, in a specific implementation process, the first vehicle may determine, based on the distance between the second vehicles included in each of the at least one departure route and based on geometric kinematics and a fuzzy theory, the departure difficulty corresponding to each of the at least one departure route. For example, the first vehicle may be steered around center of mass by using steering wheel and gear shift based on the distance between the second vehicles included in each of the at least one departure route and geometric kinematics, and may determine, based on a fuzzy theory, the departure difficulty corresponding to each of the at least one departure route. In this embodiment of this application, the first vehicle determines, based on the distance between the second vehicles included in each of the at least one departure route and based on geometric kinematics and a fuzzy theory, the departure difficulty corresponding to each of the at least one departure route. This may improve accuracy of determining, by the first vehicle, the departure difficulty corresponding to the at least one departure route.

Optionally, after determining the departure difficulty corresponding to each of the at least one departure route, the first vehicle may select, from the at least one departure route, a departure route with a lowest departure difficulty as the target departure route. For example, as shown in FIG. 7, when an order of departure difficulties corresponding to the departure routes 1 to 5 is a departure difficulty of the departure route 3<a departure difficulty of the departure route 1<a departure difficulty of the departure route 2<a departure difficulty of the departure route 5<a departure difficulty of the departure route 4, the first vehicle may select the departure route 3 as the target departure route.

In this example, because the first vehicle selects, from the at least one departure route, the departure route with the lowest departure difficulty as the target departure route, difficulty of the first vehicle driving out of the current parking area may be reduced, so that time and effort of the owner of the first vehicle may be reduced.

Certainly, the foregoing example 1 and example 2 may be used in combination in a specific implementation process.

This is not limited in this embodiment of this application. For example, as shown in FIG. 7, an order of departure difficulties corresponding to the departure routes 1 to 5 is a departure difficulty of the departure route 1<a departure difficulty of the departure route 3<a departure difficulty of the departure route 2<a departure difficulty of the departure route 5<a departure difficulty of the departure route 4, and quantities of second vehicles included in the departure routes 1 to 5 are a quantity of second vehicles included in the departure route 3<a quantity of second vehicles included in the departure route 1<a quantity of second vehicles included in the departure route 2<a quantity of second vehicles included in the departure route 5<a quantity of second vehicles included in the departure route 4. In this case, the first vehicle may select the departure route 1 with the lowest departure difficulty from the five departure routes as the target departure route. Alternatively, the first vehicle may select, as the target departure route, the departure route 3 that includes a minimum quantity of second vehicles in the five departure routes.

S203: The first vehicle determines whether there is the at least one second vehicle in the target departure route. When the first vehicle determines that there is the at least one second vehicle in the target departure route, S204 is performed. When the first vehicle determines that there is not at least one second vehicle in the target departure route, S205 is performed.

Optionally, in step S203, when the target departure route is determined by the first vehicle based on the at least one second vehicle around the current parking space and the exit location of the current parking area, for a process in which the first vehicle determines whether there is the at least one second vehicle in the target departure route, refer to Embodiment 2. Details are not described herein again. The first vehicle first detects all second vehicles between the current parking space and the exit location of the current parking area, and then determines the target departure route based on all second vehicles between the current parking space and the exit location of the current parking area. In this case, the first vehicle may determine, in a process of determining the target departure route, whether there is the at least one second vehicle in the target departure route.

S204: The first vehicle separately sends vehicle moving request information to an owner of at least one second vehicle in the target departure route.

In some embodiments, the first vehicle may separately send the vehicle moving request information to the owner of the at least one second vehicle included in the target departure route in a plurality of manners.

Manner 1: The first vehicle obtains owner information stored in a vehicle-mounted controller of each of the at least one second vehicle included in the target departure route. The first vehicle separately sends, by using the vehicle-mounted controller of the at least one second vehicle, the vehicle moving request information to the owner of the at least one second vehicle based on owner information corresponding to each of the at least one second vehicle. For example, the vehicle-mounted controller of the second vehicle may be a portable vehicle-mounted controller, so that the owner of the second vehicle carries the vehicle-mounted controller. When the first vehicle sends the vehicle moving request information to the second vehicle, the owner of the second vehicle may view the received vehicle moving request information by using a vehicle-mounted controller of the first vehicle.

In Manner 1, the first vehicle may directly communicate with the second vehicle, to avoid a case in which a vehicle of the second vehicle cannot receive the vehicle moving request information sent by the first vehicle because some information in the owner information of the second vehicle is incorrect (for example, contact information of the owner is incorrect). This can improve efficiency of communication between the first vehicle and the second vehicle.

Manner 2: The first vehicle obtains owner information stored in a vehicle-mounted controller of each of the at least one second vehicle included in the target departure route. The first vehicle sends vehicle moving request information to the vehicle-mounted controller of the at least one second vehicle based on owner information corresponding to each of the at least one second vehicle. The vehicle-mounted controller of the at least one second vehicle forwards the vehicle moving request information to a terminal communicatively connected to each of the at least one second vehicle. For example, the first vehicle first sends the vehicle moving request information to the vehicle-mounted controller of the second vehicle, so that when receiving the vehicle moving request information, the vehicle-mounted controller of the second vehicle hides owner information of the first vehicle, and then forwards, by using the vehicle-mounted controller of the second vehicle, the vehicle moving request information to the terminal communicatively connected to each of the at least one second vehicle.

In Manner 2, when receiving the vehicle moving request information, the terminal communicatively connected to each of the at least one second vehicle does not reveal the owner information of the first vehicle, so that privacy of the owner of the first vehicle can be protected.

Manner 3: The first vehicle obtains owner information stored in a vehicle-mounted controller of each of the at least one second vehicle included in the target departure route. The first vehicle sends the vehicle moving request information and owner information corresponding to each of the at least one second vehicle to the server that is configured to manage the current parking area. The server forwards, based on the owner information corresponding to each of the at least one second vehicle, the vehicle moving request information to a terminal communicatively connected to each of the at least one second vehicle. For example, the first vehicle first sends the vehicle moving request information and the owner information corresponding to each of the at least one second vehicle to the server that is configured to manage the current parking area, so that when receiving the vehicle moving request information, the server hides owner information of the first vehicle, and then forwards the vehicle moving request information to the terminal communicatively connected to each of the at least one second vehicle.

In Manner 3, when receiving the vehicle moving request information, the terminal communicatively connected to each of the at least one second vehicle does not reveal the owner information of the first vehicle, so that privacy of the owner of the first vehicle can be protected.

It should be noted that in the foregoing manners 1 to 3, the owner information includes but is not limited to a license plate identifier, owner contact information, and the like corresponding to each of the at least one second vehicle.

It should be noted that in the foregoing embodiment, the vehicle moving request information may include but is not limited to one or any combination of vehicle moving group chat request information, mobile call request information, and SMS message notification information. For example, the first vehicle may send the vehicle moving group chat request information to the vehicle-mounted controller of the second vehicle in the target departure route or the terminal that communicates with the second vehicle in the target departure route, to invite the owner of the second vehicle in the target departure route to join a group and then agree on vehicle moving time. The first vehicle sends the mobile phone request information to the vehicle-mounted controller of the second vehicle in the target departure route or the terminal that communicates with the second vehicle in the target departure route, to agree on vehicle moving time with the owner of the second vehicle in the target departure route. The first vehicle sends the SMS message notification information to the vehicle-mounted controller of the second vehicle in the target departure route or the terminal that communicates with the second vehicle in the target departure route, to indicate the owner of the second vehicle in the target departure route to move the vehicle within a specific time period. When the first vehicle determines that owners of some second vehicles in the target departure route do not join the group within preset duration (for example, 5 minutes), the first vehicle may separately send the mobile call request information and/or SMS message notification information to vehicle-mounted controllers of some second vehicles, or separately send the mobile call request information and/or SMS message notification information to terminals that communicate with some second vehicles. This is not limited in this embodiment of this application.

When the first vehicle determines that the at least one second vehicle in the target departure route has moved, the first vehicle may perform step S205.

S205: The first vehicle drives out of the current parking area based on the target departure route.

In some embodiments, when determining that there is not at least one second vehicle in the target departure route, the first vehicle may directly drive out of the current parking area based on the target departure route.

According to the foregoing vehicle moving method, the first vehicle may obtain the map information of the current parking area and automatically plan the target departure route from the current parking space to the exit location of the parking area. The owner of the first vehicle does not need to go to the parking area to plan the departure route corresponding to the first vehicle. Therefore, time of the owner of the first vehicle to plan the departure route of the first vehicle may be reduced. Further, the first vehicle may further determine whether there is the at least one second vehicle in the target departure route. When determining that there is the at least one second vehicle in the target departure route, the first vehicle may separately send the vehicle moving request information to the owner of the at least one second vehicle, to request the at least one second vehicle to move. The owner of the first vehicle does not need to go to the parking area to request, by telephone, the owner of the second vehicle included in a planned departure route to vacate the space. Therefore, time consumed by the first vehicle to drive out of the current parking area may be reduced, so that time and effort of the owner of the first vehicle are reduced.

It should be understood that, to implement the foregoing functions, the first vehicle includes a corresponding hardware structure and/or software unit (or module) for implementing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 9:
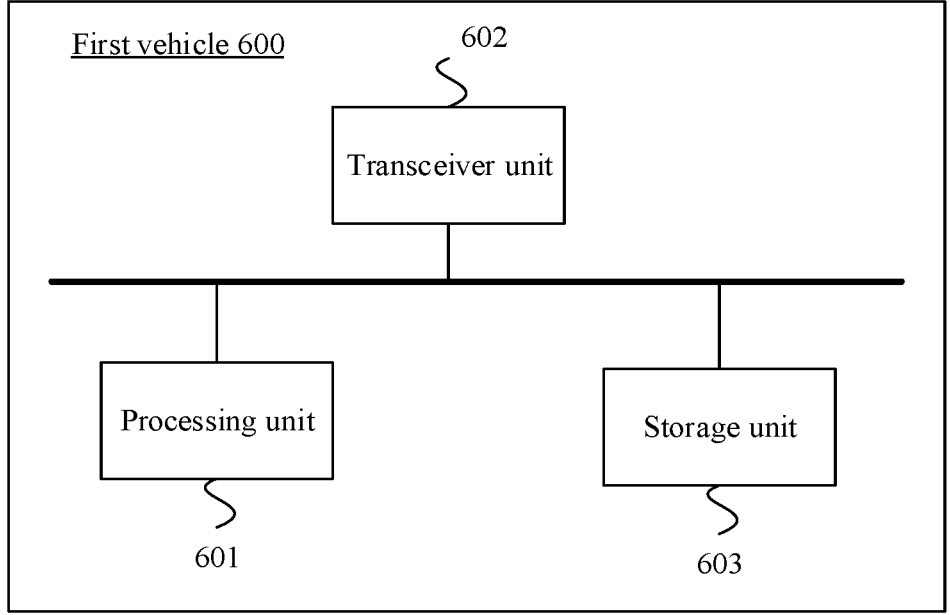
FIG. 9 is a schematic diagram of a structure of an applicable first vehicle according to an embodiment of this application.

When an integrated unit (module) is used, FIG. 9 is a schematic diagram of a structure of an applicable first vehicle according to an embodiment of this application. As shown in FIG. 9, a first vehicle 600 may include a processing unit 601 and a transceiver unit 602.

In a possible design, the processing unit 601 is configured to implement a corresponding processing function. The transceiver unit 602 is configured to support communication between the first vehicle 600 and another device (for example, a second vehicle or a server). Optionally, the transceiver unit 602 may include a receiving unit and/or a sending unit, respectively configured to perform a receiving operation and a sending operation. Optionally, the first vehicle 600 may further include a storage unit 603, configured to store program code and/or data of the first vehicle 600. The processing unit 601 may support the first vehicle 600 in performing any one of the foregoing method embodiment and the possible implementations of the foregoing method embodiment.

Specifically, in some embodiments, the processing unit 601 is configured to obtain map information of a current parking area, determine a current parking space and an exit location of the parking area based on the map information, determine a target departure route from the current parking space to the exit location based on the current parking space and the exit location, and determine whether there is at least one second vehicle in the target departure route. The second vehicle is a vehicle that obstructs the first vehicle from driving from the current parking space to the exit location. The transceiver unit 602 is configured to separately send vehicle moving request information to an owner of the at least one second vehicle when the processing unit determines that there is the at least one second vehicle in the target departure route. The vehicle moving request information is used to request the at least one second vehicle to move.

In a possible design, when determining that there is the at least one second vehicle in the target departure route, the processing unit 601 may be specifically configured to: if detecting the at least one second vehicle that is in the target departure route and that is around the current parking space, detect, by using the at least one second vehicle and an $i^{th}$ second vehicle, another second vehicle in the target departure route. The $i^{th}$ second vehicle is a vehicle in the another second vehicle. i is an integer greater than or equal to 1. When the transceiver unit does not receive feedback information sent by the $i^{th}$ second vehicle, the processing unit determines that there is the at least one second vehicle in the target departure route. The feedback information is used to feed back a parking space of an $(i+1)^{th}$ second vehicle. Alternatively, when the transceiver unit receives feedback information sent by the $i^{th}$ second vehicle, the processing unit determines that there are a plurality of second vehicles in the target departure route. When i is equal to 1, feedback information of a first second vehicle is sent by the first second vehicle after the first second vehicle receives detection information forwarded by the at least one second vehicle. Alternatively, when i is greater than 1, feedback information of an $(i+1)^{th}$ second vehicle is sent by the $(i+1)^{th}$ second vehicle after the $(i+1)^{th}$ second vehicle receives detection information forwarded by the $i^{th}$ second vehicle. The detection information is information that is sent by the first vehicle and that is used to indicate the $i^{th}$ second vehicle to detect a second vehicle in the target departure route.

In a possible design, when determining the target departure route from the current parking space to the exit location based on the current parking space and the exit location, the processing unit 601 may be specifically configured to: if detecting that there is the at least one second vehicle around the current parking space, determine at least one departure route from the current parking space to the exit location based on the at least one second vehicle around the current parking space and the exit location. The processing unit 601 selects the target departure route from the at least one departure route.

For example, when determining the target departure route from the current parking space to the exit location based on the current parking space and the exit location, the processing unit 601 may be specifically configured to: if detecting that there is the at least one second vehicle around the current parking space, detecting, by using the at least one second vehicle and the $i^{th}$ vehicle, another second vehicle located between the at least one second vehicle and the exit location. The $i^{th}$ second vehicle is the vehicle in the another second vehicle. i is the integer greater than or equal to 1. After the transceiver unit receives the feedback information sent by the $i^{th}$ second vehicle, the processing unit 601 determines the at least one departure route from the current parking space to the exit location based on the feedback information sent by the $i^{th}$ second vehicle. The feedback information is used to feed back the parking space of the $(i+1)^{th}$ second vehicle. When i is equal to 1, feedback information of a first second vehicle is sent by the first second vehicle after the first second vehicle receives the detection information forwarded by the at least one second vehicle. When i is greater than 1, the feedback information of the $(i+1)^{th}$ second vehicle is sent by the $(i+1)^{th}$ second vehicle after the $(i+1)^{th}$ second vehicle receives the detection information forwarded by the $i^{th}$ second vehicle. The detection information is information that is sent by the first vehicle and that is used to indicate the $i^{th}$ second vehicle to detect a surrounding second vehicle. The processing unit 601 selects the target departure route from the at least one departure route.

In a possible design, when selecting the target departure route from the at least one departure route, the processing unit 601 may be specifically configured to: determine, based on the feedback information sent by the $i^{th}$ second vehicle, a quantity of second vehicles included in each of the at least one departure route; and select, from the at least one departure route, a departure route that includes a minimum quantity of second vehicles as the target departure route.

In a possible design, when selecting the target departure route from the at least one departure route, the processing unit 601 may be specifically configured to: determine, based on the feedback information sent by the $i^{th}$ second vehicle, a distance between second vehicles included in each of the at least one departure route; and determine, based on the distance between the second vehicles included in each of the at least one departure route, a departure difficulty corresponding to each of the at least one departure route. The departure difficulty is used to represent a difficulty degree of the first vehicle driving out of the current parking area. The processing unit 601 selects, from the at least one departure route, a departure route with the lowest difficulty as the target departure route.

For example, the processing unit 601 may specifically determine, based on the distance between the second vehicles included in each of the at least one departure route and based on geometric kinematics and a fuzzy theory, the departure difficulty corresponding to each of the at least one departure route.

In a possible design, when detecting that there is the at least one second vehicle around the current parking space, the processing unit 601 may be specifically configured to: detect, by using a camera and/or a radar, that there is the at least one vehicle around the current parking space, and determine a distance between the first vehicle and each of the at least one vehicle; and determine, as the second vehicle around the current parking space, a vehicle that is in the at least one vehicle and whose distance from the first vehicle is less than or equal to a preset threshold.

In a possible design, when separately sending the vehicle moving request information to the at least one second vehicle, the transceiver unit 602 may be specifically configured to: obtain owner information stored in a vehicle-mounted controller of each of the at least one second vehicle, and separately send the vehicle moving request information to the owner of the at least one second vehicle based on the owner information corresponding to each of the at least one second vehicle.

Specific content of the vehicle moving request information is not limited herein in this application. For example, the vehicle moving request information may include one or any combination of vehicle moving group chat request information, mobile call request information, and SMS message notification information.

Specific content of the owner information is not limited herein in this application. For example, the owner information may be a license plate identifier, owner contact information, and the like corresponding to each of the at least one second vehicle.

In a possible design, when obtaining map information of the current parking area, the transceiver unit 602 may be specifically configured to: obtain the map information by using a terminal corresponding to the first vehicle; or when the first vehicle drives into the parking area, send an entry notification to a server configured to manage the parking area. The entry notification is used to notify the server to send the map information to the first vehicle. The first vehicle obtains the map information sent by the server.

It should be understood that operations and/or functions of various modules in the first vehicle 600 are respectively used to implement corresponding procedures of the vehicle moving method shown in FIG. 2. For brevity, details are not described herein again.

Figure 10:
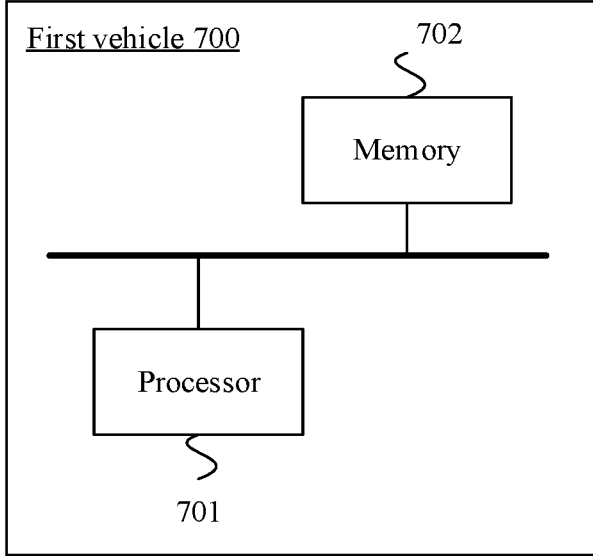
FIG. 10 is a schematic diagram of a structure of an applicable first vehicle according to an embodiment of this application.

When an integrated unit (module) is used, FIG. 10 is a schematic diagram of a structure of an applicable first vehicle according to an embodiment of this application. As shown in FIG. 10, a first vehicle 700 may include at least one processor 701 and a memory 702. The memory 702 stores one or more computer programs. When the one or more computer programs stored in the memory 702 are executed by the at least one processor 701, the first vehicle 700 is enabled to implement any one of the foregoing method embodiment and the possible implementations of the foregoing method embodiment.

Based on a same concept as the foregoing method embodiment, an embodiment of this application further provides a first vehicle. The first vehicle includes modules/units for performing any one of the foregoing method embodiment and the possible implementations of the foregoing method embodiment. These modules/units may be implemented by hardware, or may be implemented by hardware by executing corresponding software.

Based on a same concept as the foregoing method embodiment, an embodiment of this application further provides a computer-readable storage medium. The computer-readable storage medium stores a computer program. When the computer program is run on a computer, the computer is enabled to perform any one of the foregoing method embodiment and the possible implementations of the foregoing method embodiment.

Based on a same concept as the foregoing method embodiment, an embodiment of this application further provides a program product. When the program product is run on a computer, the computer is enabled to perform any one of the foregoing method embodiment and the possible implementations of the foregoing method embodiment.

Based on a same concept as the foregoing method embodiment, an embodiment of this application further provides a chip. The chip is coupled to a memory in a first vehicle, and is configured to invoke a computer program stored in the memory and perform any one of the foregoing method embodiment and the possible implementations of the foregoing method embodiment.

It should be understood that the processor or processing unit in embodiments of this application may be an integrated circuit chip, and has a signal processing capability. In an implementation process, steps in the foregoing method embodiment can be implemented by using a hardware integrated logical circuit in the processor, or by using instructions in a form of software. The processor may be a general-purpose central processing unit (CPU), a general-purpose processor, digital signal processing (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It may be understood that the memory or storage unit in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (direct rambus RAM, DR RAM). It should be noted that the memory of the system and method described in this specification includes but is not limited to these and any memory of another proper type.

Various illustrative logic units and circuits described in embodiments of this application may implement or operate the described functions by using a general-purpose processor, a digital signal processor, an application-specific integrated circuit (ASIC), a field programmable gate array (FPGA), or another programmable logic apparatus, a discrete gate or transistor logic, a discrete hardware component, or any combination thereof. The general-purpose processor may be a microprocessor. Optionally, the general-purpose processor may also be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk drive, a removable disk, a CD-ROM, or any other storage medium in the art. For example, the storage medium may connect to a processor so that the processor may read information from the storage medium and write information to the storage medium. Alternatively, the storage medium may be integrated into a processor. The processor and the storage medium may be disposed in an ASIC, and the ASIC may be disposed in an Internet of vehicles terminal. Optionally, the processor and the storage medium may alternatively be disposed in different components of the Internet of vehicles terminal.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid-state drive (SSD).

Embodiments of this application are described with reference to the flowcharts and/or block diagrams of the method, the apparatus, and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although embodiments of this application are described with reference to specific features, it is clear that various modifications and combinations may be made to them without departing from the spirit and scope of embodiments of this application. Correspondingly, the specification and the accompanying drawings are merely example descriptions of embodiments of this application that are defined by the appended claims, and are considered to cover any or all of modifications, variations, combinations, or equivalents in the scope of embodiments of this application.

What is claimed is:

1. A method, comprising:
   obtaining, by a processor or controller of a vehicle, map information of a parking area in which the vehicle is parked;
   determining, by the processor or controller of the vehicle, a current parking space of the vehicle and an exit location of the parking area based on the map information;
   determining, by the processor or controller of the vehicle, a plurality of target departure routes from the current parking space to the exit location based on the current parking space and the exit location;
   detecting, by the processor or controller of the vehicle, blocking vehicles on the plurality of target departure routes, wherein each of the blocking vehicles is at least partially parked in a respective parking space of the parking area and is between the vehicle and the exit location on a respective target departure route, and wherein detecting the blocking vehicles includes detecting one or more blocking vehicles via a camera and/or a radar of the vehicle;
   determining, by the processor or controller of the vehicle, difficulty levels corresponding to the plurality of target departure routes;
   selecting, by the processor or controller of the vehicle, a departure route from the plurality of target departure routes based on the determined difficulty levels; and
   causing, by the processor or controller of the vehicle, a transceiver of the vehicle to send a vehicle moving request to an owner of a blocking vehicle on the selected departure route to move off the selected departure route.

2. The method according to claim 1, wherein determining the difficulty levels corresponding to the plurality of target departure routes is based on a fuzzy theory.

3. The method according to claim 1, further comprising:

providing information regarding the selected departure route to an owner of the vehicle.

4. The method according to claim 1, further comprising:

exiting, by the vehicle, the parking area via the selected departure route.

5. The method according to claim 1, wherein detecting the blocking vehicles on the plurality of target departure routes comprises:

transmitting detection requests to surrounding vehicles that are adjacent to the vehicle, wherein the detection requests request the surrounding vehicles to provide identification information and to forward further detection requests to further vehicles around the surrounding vehicles; and receiving information regarding respective blocking vehicles in response to the detection requests and the further detection requests.

6. The method according to claim 5, wherein the information regarding respective blocking vehicles includes distance information regarding respective distances between vehicles; and wherein determining the difficulty levels is based on the distance information.

7. The method according to claim 6, wherein determining the difficulty levels is further based on geometric kinematics and a fuzzy theory.

8. A vehicle, comprising:

a processor or controller;

a camera and/or a radar; and a transceiver;

wherein the processor or controller of the vehicle is configured to:

obtain map information of a parking area in which the vehicle is parked;

determine a current parking space of the vehicle and an exit location of the parking area based on the map information;

determine a plurality of target departure routes from the current parking space to the exit location based on the current parking space and the exit location;

detect blocking vehicles on the plurality of target departure routes, wherein each of the blocking vehicles is at least partially parked in a respective parking space of the parking area and is between the vehicle and the exit location on a respective target departure route, and wherein detecting the blocking vehicles includes detecting one or more blocking vehicles via the camera and/or the radar of the vehicle;

determine difficulty levels corresponding to the plurality of target departure routes;

select a departure route from the plurality of target departure routes based on the determined difficulty levels; and cause the transceiver of the vehicle to send a vehicle moving request to an owner of a blocking vehicle on the selected departure route to move off the selected departure route.

9. The vehicle according to claim 8, wherein determining the difficulty levels corresponding to the plurality of target departure routes is based on a fuzzy theory.

10. The vehicle according to claim 8, wherein the processor or controller of the vehicle is further configured to:

provide information regarding the selected departure route to an owner of the vehicle.

11. The vehicle according to claim 8, wherein the processor or controller of the vehicle is further configured to:

cause the vehicle to exit the parking area via the selected departure route.

12. The vehicle according to claim 8, wherein detecting the blocking vehicles on the plurality of target departure routes comprises:

transmitting detection requests to surrounding vehicles that are adjacent to the vehicle, wherein the detection requests request the surrounding vehicles to provide identification information and to forward further detection requests to further vehicles around the surrounding vehicles; and receiving information regarding respective blocking vehicles in response to the detection requests and the further detection requests.

13. The vehicle according to claim 12, wherein the information regarding respective blocking vehicles includes distance information regarding respective distances between vehicles; and wherein determining the difficulty levels is based on the distance information.

14. The vehicle according to claim 13, wherein determining the difficulty levels is further based on geometric kinematics and a fuzzy theory.

15. A non-transitory computer-readable medium having processor-executable instructions stored thereon, wherein the processor-executable instructions, when executed, cause performance of the following:

obtaining, by a processor or controller of a vehicle, map information of a parking area in which the vehicle is parked;

determining, by the processor or controller of the vehicle, a current parking space of the vehicle and an exit location of the parking area based on the map information;

determining, by the processor or controller of the vehicle, a plurality of target departure routes from the current parking space to the exit location based on the current parking space and the exit location;

detecting, by the processor or controller of the vehicle, blocking vehicles on the plurality of target departure routes, wherein each of the blocking vehicles is at least partially parked in a respective parking space of the parking area and is between the vehicle and the exit location on a respective target departure route, and wherein detecting the blocking vehicles includes detecting one or more blocking vehicles via a camera and/or a radar of the vehicle;

determining, by the processor or controller of the vehicle, difficulty levels corresponding to the plurality of target departure routes;

selecting, by the processor or controller of the vehicle, a departure route from the plurality of target departure routes based on the determined difficulty levels; and causing, by the processor or controller of the vehicle, a transceiver of the vehicle to send a vehicle moving request to an owner of a blocking vehicle on the selected departure route to move off the selected departure route.

16. The non-transitory computer-readable medium according to claim 15, wherein determining the difficulty levels corresponding to the plurality of target departure routes is based on a fuzzy theory.

17. The non-transitory computer-readable medium according to claim 15, wherein the processor-executable instructions, when executed, further cause performance of the following:

providing information regarding the selected departure route to an owner of the vehicle.

18. The non-transitory computer-readable medium according to claim 15, wherein the processor-executable instructions, when executed, further cause performance of the following:

exiting, by the vehicle, the parking area via the selected departure route.

19. The non-transitory computer-readable medium according to claim 15, wherein detecting the blocking vehicles on the plurality of target departure routes comprises:

transmitting detection requests to surrounding vehicles that are adjacent to the vehicle, wherein the detection requests request the surrounding vehicles to provide identification information and to forward further detection requests to further vehicles around the surrounding vehicles; and receiving information regarding respective blocking vehicles in response to the detection requests and the further detection requests.

20. The non-transitory computer-readable medium according to claim 19, wherein the information regarding respective blocking vehicles includes distance information regarding respective distances between vehicles; and wherein determining the difficulty levels is based on the distance information.

21. The non-transitory computer-readable medium according to claim 20, wherein determining the difficulty levels is further based on geometric kinematics and a fuzzy theory.

\* \* \* \* \*